United States Patent
Richards

[19]

[11] Patent Number: 6,069,957
[45] Date of Patent: May 30, 2000

[54] METHOD AND APPARATUS FOR PROVIDING HIERARCHICAL KEY SYSTEM IN RESTRICTED-ACCESS TELEVISION SYSTEM

[75] Inventor: William James Richards, Bradford, Mass.

[73] Assignee: Lucent Technologies Inc., Murray Hill, N.J.

[21] Appl. No.: 08/810,441

[22] Filed: Mar. 7, 1997

[51] Int. Cl.[7] .............................. H04L 9/00; H04K 1/00
[52] U.S. Cl. .................... 380/281; 380/210; 380/278; 380/283; 380/284; 380/45
[58] Field of Search ............................... 380/10, 20, 210, 380/278, 281, 283, 284, 45

[56] References Cited

U.S. PATENT DOCUMENTS 5,237,610   8/1993   Gammie et al. ........................ 380/10

OTHER PUBLICATIONS

"Applied Cryptography," 2nd Edition, by Bruce Schneier (1995).

*Primary Examiner*—Gail O. Hayes
*Assistant Examiner*—Hrayr A. Sayadian

[57] ABSTRACT

An encryption system for restricted-access television systems. Decryption keys, which are used to decrypt program material, are transmitted to customers in a restricted-access television system. The keys are transmitted as a hierarchy, wherein one key unlocks another key, and the last key unlocked is used to decrypt program material. Such a hierarchy is sometimes called "key-upon-key" encryption. The system transmits a second key that produces a first key from a cipher text (which first key decrypts a first program material) and wherein the second key also decrypts a second program material.

2 Claims, 30 Drawing Sheets

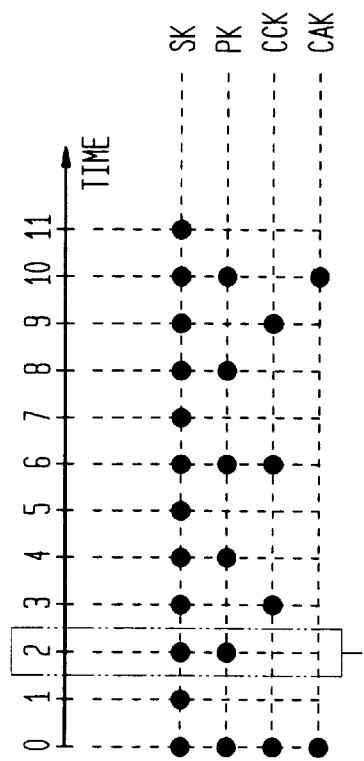
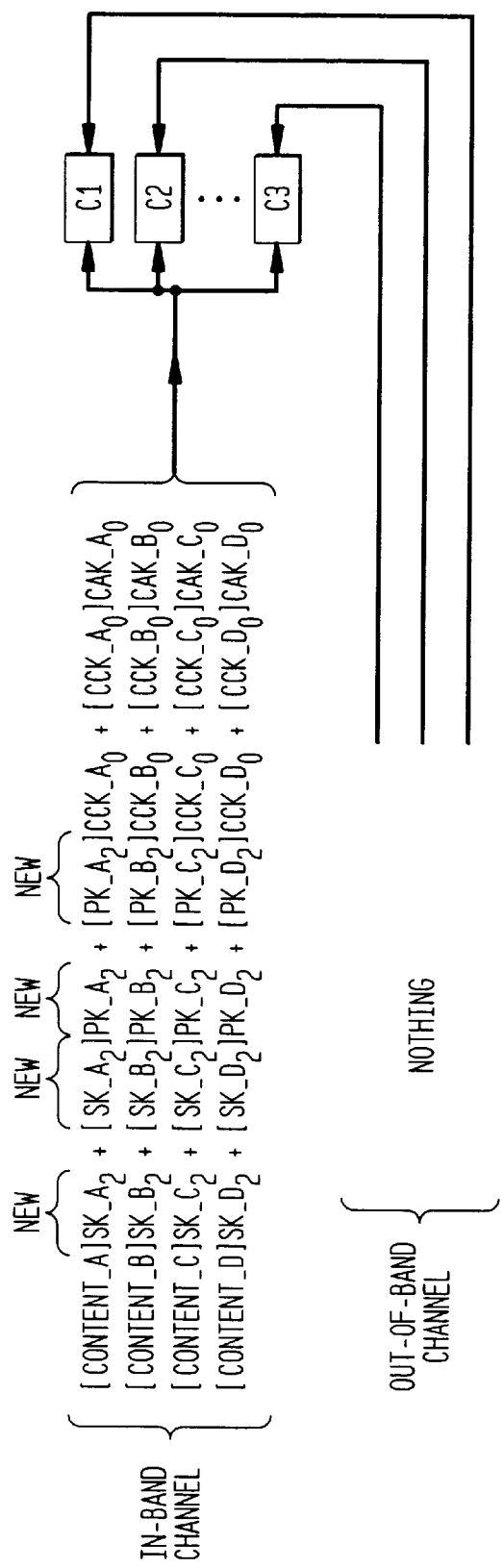
FIG. 20

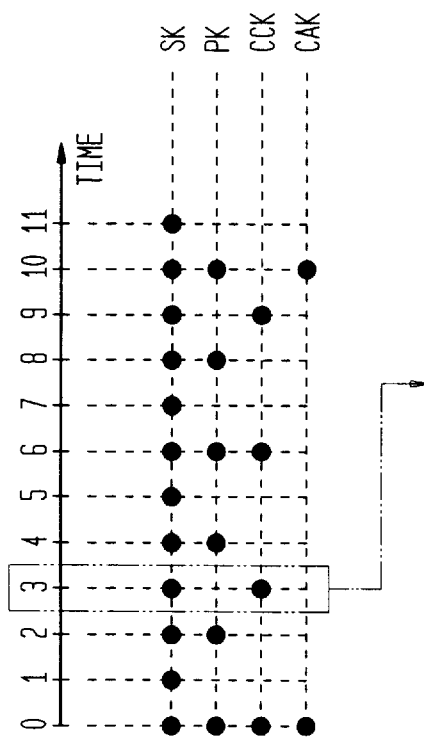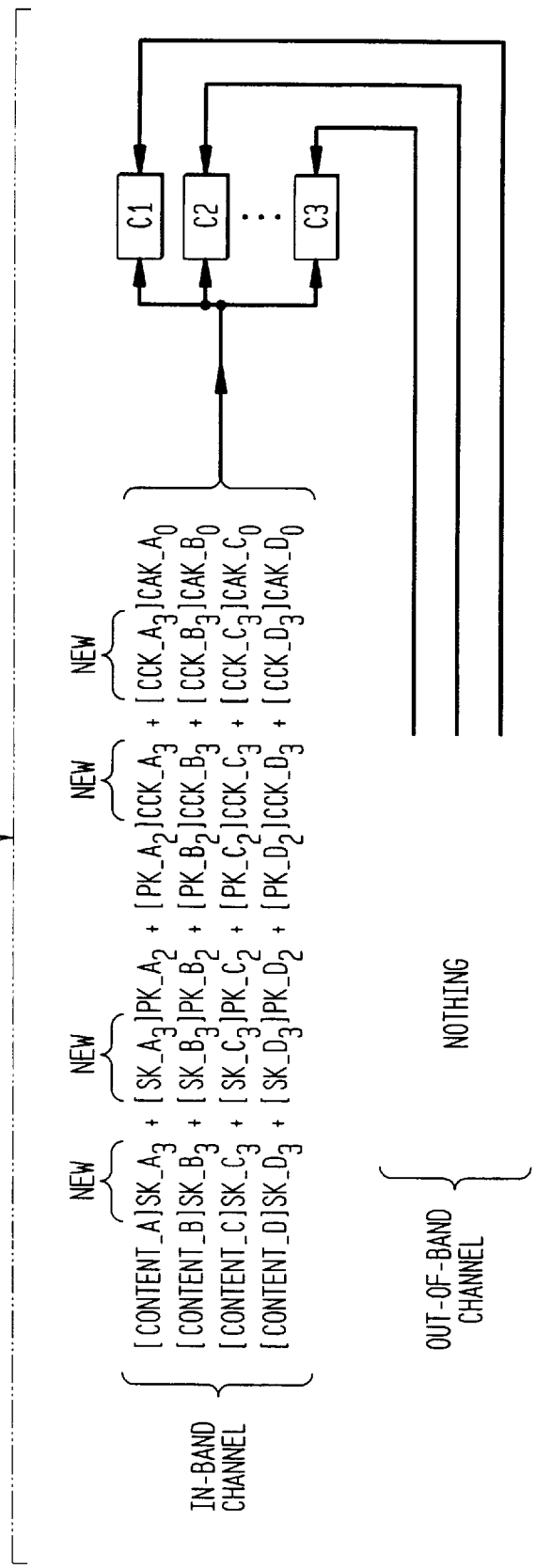
FIG. 22

METHOD AND APPARATUS FOR PROVIDING HIERARCHICAL KEY SYSTEM IN RESTRICTED-ACCESS TELEVISION SYSTEM

The invention concerns encryption and decryption systems for communication systems, such as cable television networks and video conferencing systems.

BACKGROUND OF THE INVENTION

Existing cable television systems (1) scramble programs, (2) transmit the scrambled programs to customers, and (3) provide the customers with "set-top boxes" for unscrambling the programs. Many such television systems operate in the analog signal domain.

However, digital signal transmission is coming into widespread use. Digital signal transmission possesses characteristics which are different from analog signal transmission. The invention presents novel modes of transmission and encryption which are especially suited to the unique capabilities of digital signal transmission.

SUMMARY OF THE INVENTION

In one form of the invention, decryption keys, which are used to decrypt program material, are transmitted to customers in a restricted-access television system. The keys are transmitted as a hierarchy, wherein one key unlocks another key, and the last key unlocked is used to decrypt program material. Such a hierarchy is sometimes called "key-upon-key" encryption.

BRIEF DESCRIPTION OF THE DRAWINGS

FIG. 4 illustrates the keys used at time t=0.

FIG. 9 illustrates the keys used at time t=0.

FIG. 20 is similar to FIG. 16, but for time t=2.

FIG. 22 is similar to FIG. 16, but for time t=3.

DETAILED DESCRIPTION OF THE INVENTION

General Background—Digital Cable Television

This discussion will first present some general principles of operation used in digital cable television systems.

In a such systems, a television program is delivered to a customer in the form of a stream of digital data, along a data link, such as a coaxial cable network. The data link, which has a relatively high bandwidth, is divided into individual channels of narrower bandwidth. The channels typically contain sufficient bandwidth to carry multiple television programs. For example, under one standard commonly used, each channel is allocated 28 MegaHertz (MHz) of bandwidth, which is sufficient to carry nine television programs, of 3 MHz bandwidth each.

Figure 1:
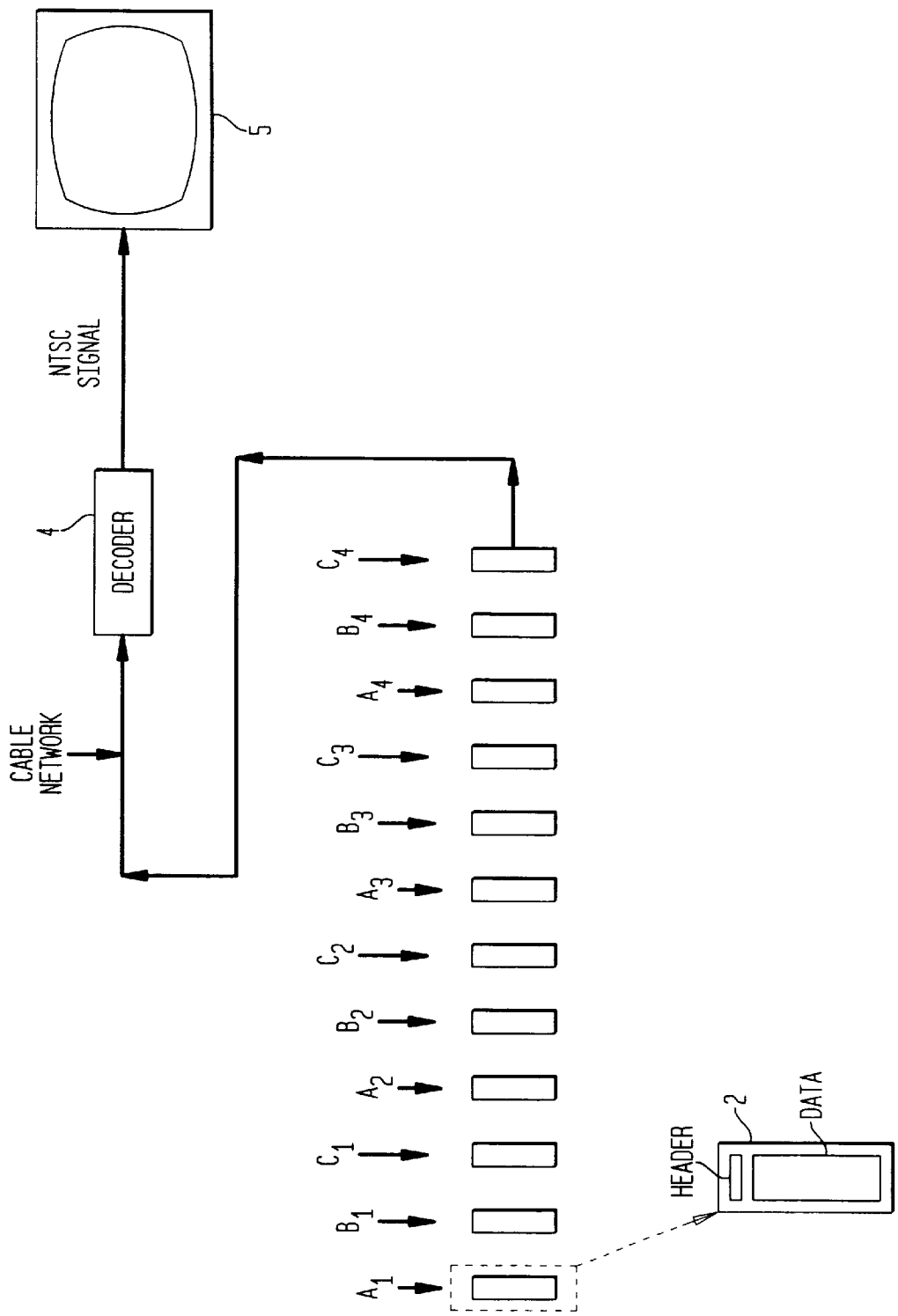
FIG. 1 illustrates packets of digital data in a cable television system.

The multiple television programs are transmitted along the channel in the form of packets 2 of digital data, as indicated in FIG. 1, which shows packets for three programs, namely, A, B, and C. Time-multiplexing is used to transmit the packets, wherein a sequence of A-, B-, and C-packets is transmitted, such as $A_1$, $B_1$ and $C_1$, followed by another sequence, such as $A_2$, $B_2$, and $C_2$, and so on, as indicated in the Figure.

Each packet contains a HEADER, as indicated, which identifies the program to which the packet belongs, as well as other overhead information, which is not relevant to this discussion. Each customer is equipped with a decoder 4, commonly called a "set-top box," which reads the headers, extracts the appropriate packets as they arrive and processes them into an NTSC (National Television Standards Committee) signal, which is delivered to an ordinary television 5, as indicated. For example, if the customer wishes to receive program A, the decoder 4 reads the headers of all packets as they arrive, and extracts packets $A_1$, $A_2$, $A_3$ and so on, as they are received.

The data packets are distributed in "parallel" to all customers. That is, all customers receive all the packets for all programs broadcast. However, it is desirable to restrict access of customers to the programs. That is, certain customers are to be granted access to program A, others to program B, and so on. The invention is concerned with various encryption approaches which facilitate this restriction.

General Background—Encryption and Decryption

This section will present some observations of the Inventor relating to the field of cryptography.

Encryption Algorithm. Data encryption involves the use of an encryption algorithm, which itself is controlled by an encryption key. In general, any encryption algorithm is considered acceptable, if it is of sufficient complexity to force an attacker to attack the key used by the algorithm, rather than attacking the algorithm itself. Many suitable algorithms are available in the art. While the DES encryption algorithm is used in one embodiment of the invention, others could also be used.

Strong Key vs. Weak Key Systems. Encryption keys are often referred to as being "strong" or "weak" keys. The term usually applies to the degree of difficulty an attacker would confront in ascertaining the value of a given key. One of the simplest key attacks is known as a "brute force" attack, where the attacker tries every possible combination of the key until the correct key is found.

If, for example, a 4-bit key is used, 16 possible key combinations exist. Thus, an attacker would, on average, be able to find the key after attempting 8 of the possible 16 combinations. This average of 8 attempts is computed as follows. Since, a priori, every key combination (i.e., first, second, . . . sixteenth) has an equal probability of success, the overall probability of success equals the total number of possible combinations divided by two, or eight in this example. As another example, if the encryption key were 8-bits long, then the total number of key combinations would be 256. The attacker would, on average, need 128 attempts to find the value of the key used.

Since each attempt imposes a cost upon the attacker (i.e., each attempt costs the attacker time, money, or both), increasing the number of attempts required is a deterrent to attempts to crack the key. Thus, an 8-bit key, because of its higher cost to crack, is considered a stronger key than a 4-bit key.

However, there are some major disadvantages associated with using a strong encryption key. As a rule, the stronger the encryption key (i.e., the more bits in the key), the more complex and expensive the security hardware becomes. For example, using a 56-bit encryption key and single-DES encryption, a low-cost decryption system can be built for around $5.00, in large quantities, in 1996. This system could perform the decryption operation at data rates up to 30 Mbs (Mega-bits per second). In contrast, if the more complex triple-DES encryption is used, using a stronger 112-bit key, then the cost of the decryption device will increase to around $30.00. Further, the data rate would decrease to around 3 Mbs. The cost increased six-fold, but the data rate decreased ten-fold.

Stated simply, the longer the key, the larger is the number of computations which the security hardware must perform to decrypt a given piece of data. To perform the computations quickly, complex and expensive computation hardware is required.

These factors increase the complexity and cost of the decryption operation and also may reduce the data throughput of the decryption hardware. This increased hardware cost and lower performance limits the use of strong keys in a cable television system.

Attacker's Cost vs. Attacker's Benefit. While attacking the key represents a cost to the attacker, if the key is successfully attacked, then the information obtained by later using the key represents a benefit to the attacker. One objective of this invention is to develop a security architecture where the cost of an attack far exceeds the benefit of the information obtained.

If the ratio of the cost of attack to the value of the information obtained can be made large enough, no attack on the system will be attempted, and the information being encrypted will be considered safe. It must be noted that there are two major methods to prevent attacks on the security system.

The first, and most common, method is to use long keys. For example, early encryption systems used single-DES encryption, which uses a key of 56 bits in length. But the invention of faster and cheaper computers has made brute-force attacks on such keys feasible. (To counter this feasibility, triple-DES encryption, which uses a longer key, is now being deployed, and is becoming a standard in the art.)

The second method is to reduce the value of the information obtained through a successful key attack. One way to reduce the value of the information is to limit the amount of information being protected by a single key. For example, encrypting an entire two hour movie using a single 56-bit encryption key might encourage an attack, because obtaining a single key provides the benefit of access to a two-hour movie. On the other hand, using the 56-bit key for only a small portion of the movie, say 5 minutes, would discourage an attack, because obtaining a single key provides the benefit of access to merely a five-minute segment of a two-hour movie.

Clearly, depending on the type of material being protected, using frequently changing weak keys to protect short segments of the material can be very effective in preventing an attack on the encrypted material.

Key Distribution. A major problem in a weak-key system, which typically encrypts short segments of material using weak keys, is the need to repeatedly provide new decryption keys to the decryption hardware units, which are located at customer sites. In a cable television system, the distribution of decryption keys is normally handled by an Access Control System, which is generally separate from the system which actually broadcasts programs over the cable network.

The Access Control System is responsible for distributing to customers the decryption keys necessary to decrypt the programming material. The distribution is typically accomplished by sending to each customer the decryption keys, but in encrypted form. Each customer's decryption hardware is assigned a unique customer-key. The decryption keys are encrypted using the customer-keys, so that each customer's hardware can obtain only the decryption keys intended for it.

However, the large number of customers commonly found in cable television systems creates a problem in this respect. Assume that 100,000 customers exist. If, in a weak-key system, the Access Control System wished to change the decryption key, then the Access Control System would need to encrypt the new key 100,000 different times, each time using each customer's unique key. The Access Control System would also need to transmit these 100,000 uniquely encrypted keys over the communications channel linking the customers with the Access Control System. (This communications channel is often referred to as the Out-Of-Band channel.) These 100,000 encryption, and transmission, steps present a large amount of overhead to the Access Control System.

Thus, in the weak-key system, if the encryption keys are frequently changing, the Access Control System becomes overloaded by trying to encrypt and send the new decryption keys to the customers. In order for a weak-key system to function efficiently, some method of distributing the key-change information to the customers must be developed which does not involve the Access Control System.

The invention addresses this key distribution problem by using the communication channel which carries the programming material for a second function, namely, distributing the decryption keys. The invention also frees the Access Control System from the task of encrypting the decryption keys, according to each customer's unique customer key, in a manner which will be explained later.

Key Storage by Customers. In order for the customer's hardware to decrypt programs, the decryption keys for those programs must normally be stored in the customer's hardware. These keys are normally sent to the customer in advance of broadcast of the program.

If, for example, a customer wished to view programs carried on ten different programming channels, then the customer's hardware would be required to store ten different decryption keys, which is considered a manageable number of keys. However, the number of keys requiring storage is rapidly increasing: with current advances in broadcast technology, it is now possible for a cable system subscriber to select from hundreds of programming channels, each requiring storage of its own key.

The large number of available channels would require additional memory in every customer's hardware system. To avoid this requirement of additional memory, in the past, cable service providers did not allow selection of individual programs by customers. Instead, the providers bundled programs into packages, and sold the packages instead.

A customer could purchase a "standard" unencrypted package of channels, or "premium" packages containing additional programs. Access to the packages was gained using a Package Key, which was stored in the customer's hardware. This Package Key was then used to decrypt and store individual program decryption keys. Thus, a package containing 10 programming channels, would require the customer's hardware to store 11 decryption keys.

Therefore, (1) the need to transmit the decryption keys, usually over an out-of-band channel, and (2) the need to store these keys both placed a limit on both the number of packages offered, and the number of programs contained in each package.

The invention addresses the issues discussed above. The invention presents an effective security architecture that allows a cable service provider to (1) utilize low-cost encryption/decryption hardware, (2) utilize a reduced amount of memory for key storage in customers' hardware, and (3) provide almost unlimited flexibility in packaging programs into bundles.

These features are provided by while significantly reducing involvement of the Access Control System. All encryption/decryption operations are controlled by the encryption/decryption hardware, thereby freeing the Access Control System for other tasks.

ONE FORM OF INVENTION

Single Key

Figure 2:
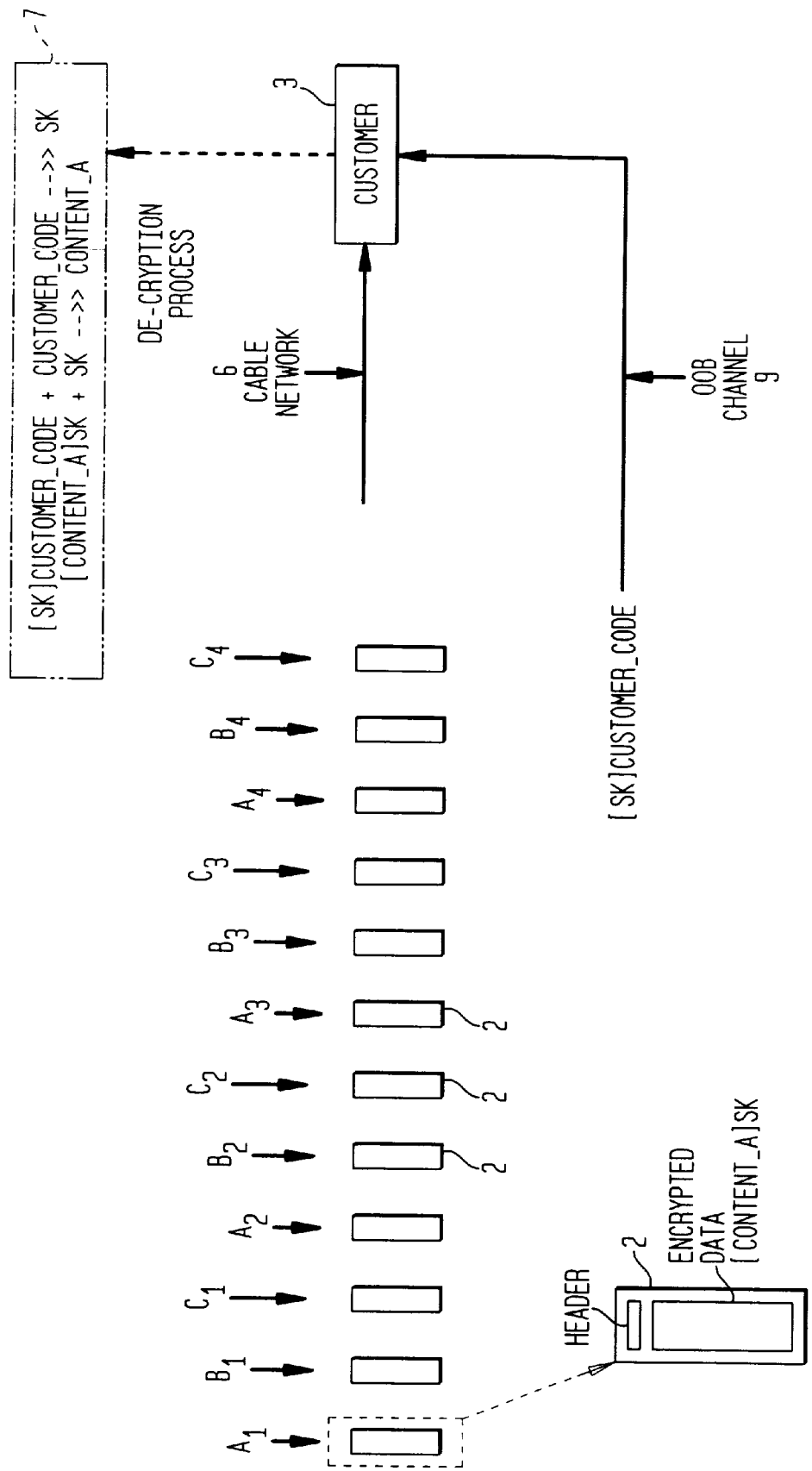
FIG. 2 illustrates transmission of encrypted digital data in a cable television system, and transmission of a decryption key to a customer via an out-of-band channel, OOB.

FIG. 2 illustrates one approach to encryption of the programs. The data contained within each packet 2 is encrypted, as indicated for packet $A_1$. Encryption schemes are known in the art, and the well known DES algorithm represents one encryption scheme. A "key" is required to decrypt the encrypted data. Keys are digital words, and are also known in the art.

A convention regarding symbolism must be explained at this point. In FIG. 2, the phrase [CONTENT_A]SK, appearing at the lower left part of the Figure, contains two parts, namely, "[CONTENT_A]" and "SK". "[CONTENT_A]" refers to data content for program A, but in encrypted form. The phrase [CONTENT_A], by itself, does not indicate the type of key used. "SK" refers to a key. (SK is an acronym for "Segment Key," which is a term which will acquire significance as this discussion proceeds). The overall phrase "[CONTENT_A]SK" refers to the data content for program A, but encrypted using key SK.

The expression

[CONTENT_A]SK+SK-->>CONTENT_A refers to the process of decrypting [CONTENT_A]SK, using key SK, to obtain the decrypted CONTENT_A. CONTENT_A is a packet of usable, decrypted data.

In partial recapitulation of the symbolism convention:

1. The phrase "CONTENT_A", without brackets, refers to digital data, for program A, non-encrypted.
2. The phrase "[CONTENT_A]", having brackets, refers to digital data, for program A, in encrypted form, but the key is not indicated.
3. The phrase "[CONTENT_A]SK", refers to digital data, for program A, in encrypted form, and also indicates the key, SK, which is used.

Returning to FIG. 2, the encrypted packets, for programs A, B, and C, are delivered, in sequence, to the customer 3 by the cable network 6. The customer requires the key, SK, to decrypt the packets. This key is delivered to the customer, not along the same channel carrying the packets, but via a different route, such as through an Out-of-Band (OOB) channel 9.

The out-of-band channel 9 can take numerous forms. One form is a separate channel, or frequency spectrum, lying outside the channel, or frequency spectrum, used to carry the program data packets. But both channels reside within the bandwidth of the data link, indicated by cable network 6 in FIG. 2. As a specific example, both channels can be carried by the same coaxial cable, or optical fiber. Another form of out-of-band channel is a separate data link entirely, such as common telephone line. In the general case, the out-of-band channel is a communication link allowing transfer of small numbers of data packets to customers.

The key, SK, carried by the out-of-band channel, and required to decrypt [CONTENT_A] is also encrypted, as indicated by the phrase [SK]CUSTOMER_CODE, located at bottom, center, in FIG. 2. This phrase indicates that the key SK is encrypted using another key, namely, "CUSTOMER_CODE."

To repeat, so far, two keys have been discussed:

(1) SK, which "unlocks" the encrypted data packet, [CONTENT_A]SK, and (2) CUSTOMER_CODE, which unlocks the encrypted key, [SK]CUSTOMER_CODE.

At present, the customer 3 is assumed to be in possession of the CUSTOMER_CODE. Conceptually, the CUSTOMER_CODE can be viewed as a serial number, which is assigned to the customer's set-top box. For example, the CUSTOMER_CODE can be permanently loaded into a memory region of the set-top box assigned to the customer.

Using the CUSTOMER_CODE, the set-top box decrypts the data [SK]CUSTOMER_CODE, as indicated by the phrase

[SK]CUSTOMER_CODE+CUSTOMER_CODE-->>SK contained in the dashed box 7 located above customer 3. Then, the set-top box uses the SK obtained to decrypt [CONTENT_A]SK, to obtain CONTENT_A, the content of program A, as indicated by the phrase (CONTENT_A)SK+SK-->>CONTENT_A.

Now, CONTENT_A, a data packet, becomes available for translation into an NTSC signal.

Different SK Key for Each Program

The preceding section presumed that all programs (A, B, and C) are encrypted using the same key, SK. Under this presumption, any customer in possession of SK can decrypt all programs. However, as explained above, the risk of attack is dependent on the value of the material obtained, compared with the cost of the attack. If a single key, SK, is used to protect several programs, then the benefit of an attack is relatively high, thereby reducing the overall deterrent to an attack.

Figure 3:
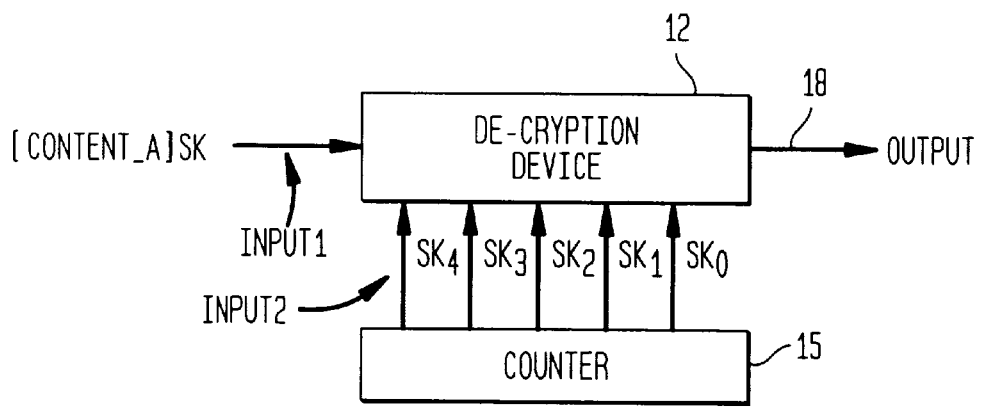
FIG. 3 is a schematic illustration of a decryption device 12, which receives a key as INPUT2 and encrypted cipher text as INPUT1.

For example, an attacker may perform a "brute force" attack on the system, using the hardware shown in FIG. 3, which includes a commercially available decryption device 12, of the same type indicated by dashed block 7 in FIG. 2. This decryption device 12 in FIG. 3 may be viewed as having two inputs: INPUT_1 for encrypted program data, and INPUT_2 for the key.

The attacker may receive and record all encrypted data packets for a program, such as program A, from the cable network 6 in FIG. 2. Then, the attacker may feed the data packets, designated [CONTENT_A]SK in FIG. 3, to the decryption device 12. In addition, the attacker can apply a digital counter 15 to the key input of the decryption device 12. The attacker increments the counter 15, thereby causing it to eventually produce a number which matches the SK used to encrypt the program content. At that time, meaningful video output is obtained, at the output 18, and the key SK becomes known.

The length of time required for this cracking process depends primarily on the length of the key SK. For a key length of about 56 bits, the cracking process is expected to take perhaps four days. However, the time of four days is not necessarily a large deterrent to cracking attempts, since the cracking process can be automated. For example, circuitry can be devised which examines the video output of the decryption device, on line 18 in FIG. 3, and looks for proper horizontal or vertical synch pulses. When they are found, the output of the counter 15 matches the key SK, and the value of the key SK becomes known. Once the value of SK becomes known, all programs being encrypted using this key can be decrypted.

To deter such attacks, in a more complex form of the invention, each program is encrypted using a different key, such as SK_A for program A, SK_B for program B, and so on. The different keys are delivered to the customer 3 by the out-of-band channel, and each encrypted using CUSTOMER_CODE as key. The customers' decoders contain memory which stores the keys.

One feature of this form of the invention may be undesirable in certain situations. This feature is that the keys SK do not change with time. As explained above, if a given key is used for a long duration, then the value of program material available through attacking the key increases, thereby increasing the risk of such an attack. As also explained above, to compensate for the long duration of key-use, a stronger key can be used. But the stronger key requires more complex and costly decryption hardware, and also reduces the data throughput of the hardware.

Another possible disadvantage of the single-key system is the requirement, explained above, that the Access Control System become involved in the process of transmitting the decryption keys to the customers. Many cable television providers serve hundreds of thousands of customers, rather than the single customer 3 in FIG. 2. Each customer must be provided with the proper key, or keys, for the programming to which that customer is entitled. Transmission of such a large number of keys generates a significant amount of traffic on the out-of-band channel 9. For example, 100,000 customers require at least 100,000 key-delivery messages, and a greater number if different keys are used for different programs. A large amount of key-delivery traffic in the out-of-band channel restricts the amount of data which can be transmitted for other purposes, such as impulse-purchase of movies-on-demand.

SECOND FORM OF THE INVENTION

Figure 4:
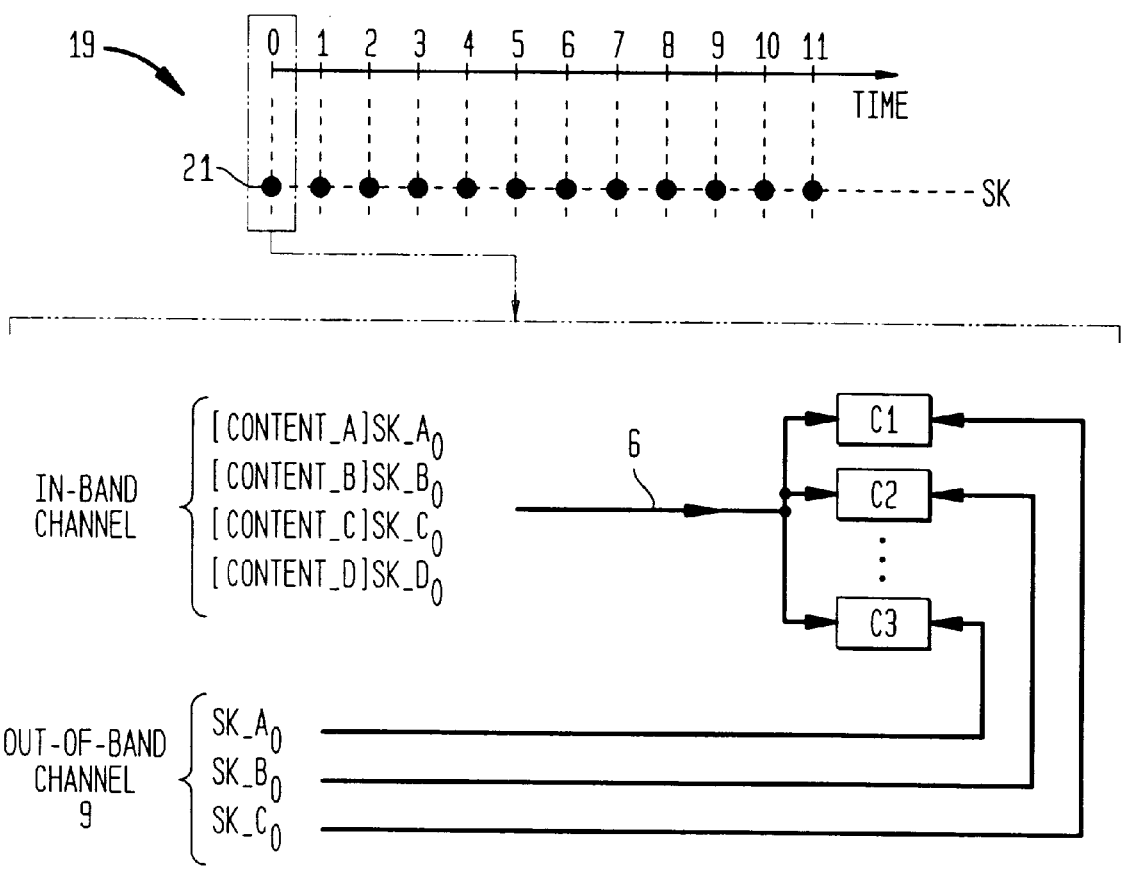
FIG. 4 illustrates encryption of different program CONTENTs by respective keys SK, which change as time progresses.

FIG. 4 illustrates another form of the invention, wherein multiple programs (e.g., CONTENT_A, CONTENT_B, etc.) are delivered on the cable network 6. These programs are available to all customers in common, such as customers C1, C2, and so on, as indicated.

FIG. 4 indicates that each program is encrypted using a different key, such as SK_A for CONTENT_A, SK_B for CONTENT_B, and so on. The subscripts appearing adjacent the keys will be explained below. The keys are delivered using the out-of-band channel 9. Encryption of the keys is undertaken, as in FIG. 2, but is not indicated, to avoid clutter.

The keys SK are changed periodically, as indicated by the time-plot 19 at the top of FIG. 4. Each dot, such as dot 21, indicates a key change. For example, at time 0, for program A, key $SK\_A_0$ begins to be used: the subscript 0 refers to the time of change of the key.

Changing the keys significantly increases the effort required to crack the encryption. For example, cracking a given program may ordinarily require the four days mentioned above. However, if the key SK is changed 20 times during the program, then the cracking time has increased to approximately 80 days, which is viewed as a significantly greater deterrent.

Figure 5:
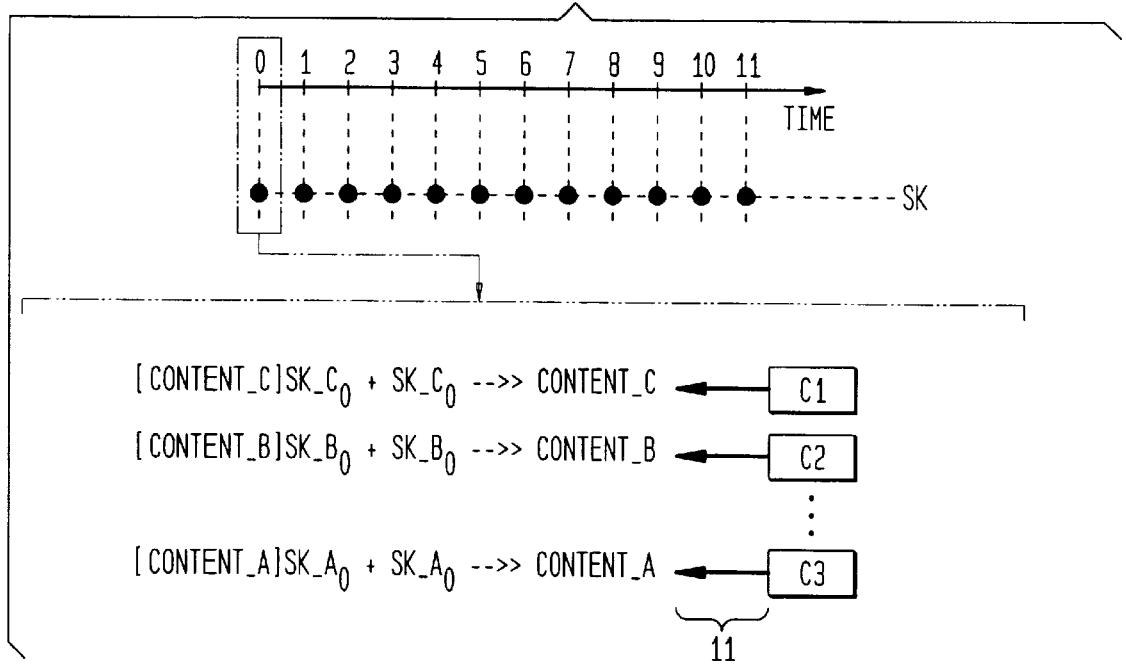
FIG. 5 illustrates the decryption process for the CONTENTs of FIG. 4.

Each customer who is entitled to view a given program must gain access to the sequence of keys needed to decrypt that program. In FIG. 4, customers C3, C2, and C1 are entitled to view programs A, B, and C, respectively, and, prior to time 0, receive keys $SK\_A_0$, $SK\_B_0$, and $SK\_C_0$, respectively. (Again, the keys are encrypted, but the encryption is not shown.) The decoder of each customer performs the process indicated by arrows 11 shown in FIG. 5.

This embodiment explains the choice of the term "segment key," which is represented by the acronym SK. Different time-segments of the programs are encrypted using different segment keys, SK.

Figure 6:
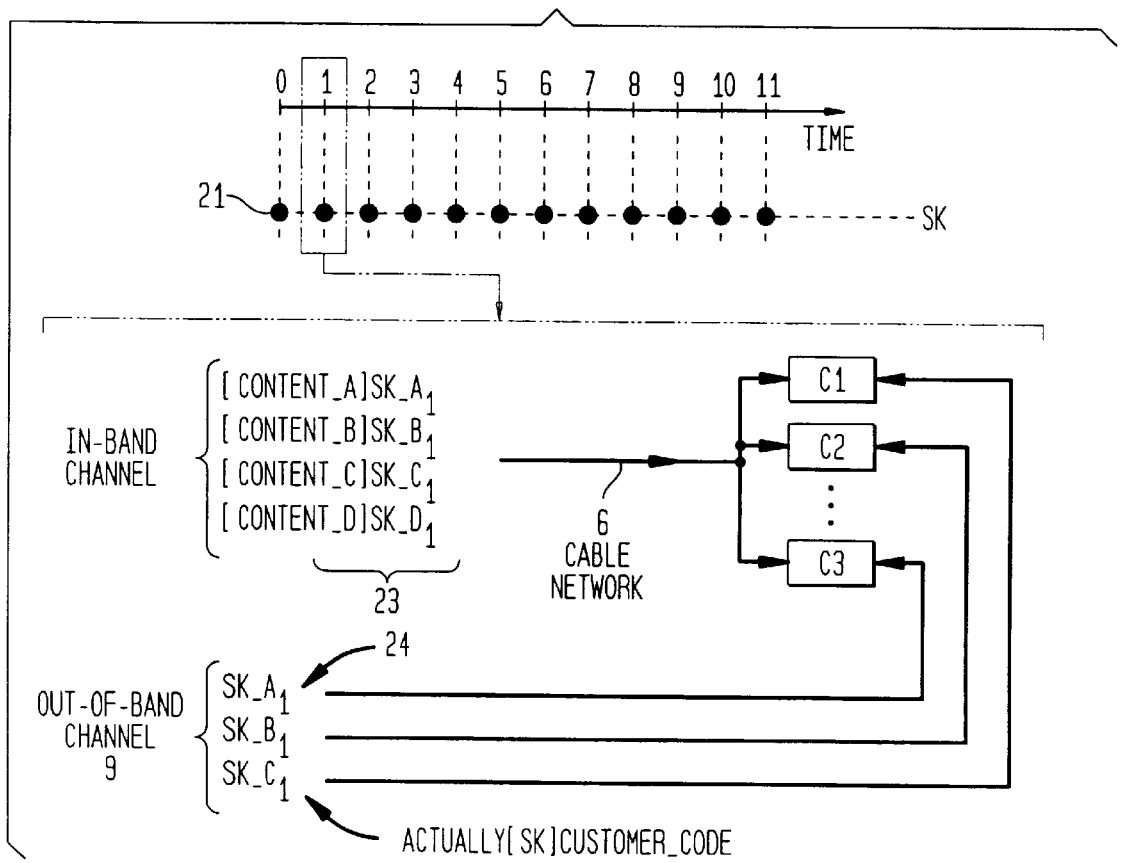
FIG. 6 is similar to FIG. 4, but showing decryption at time t=1.
Figure 7:
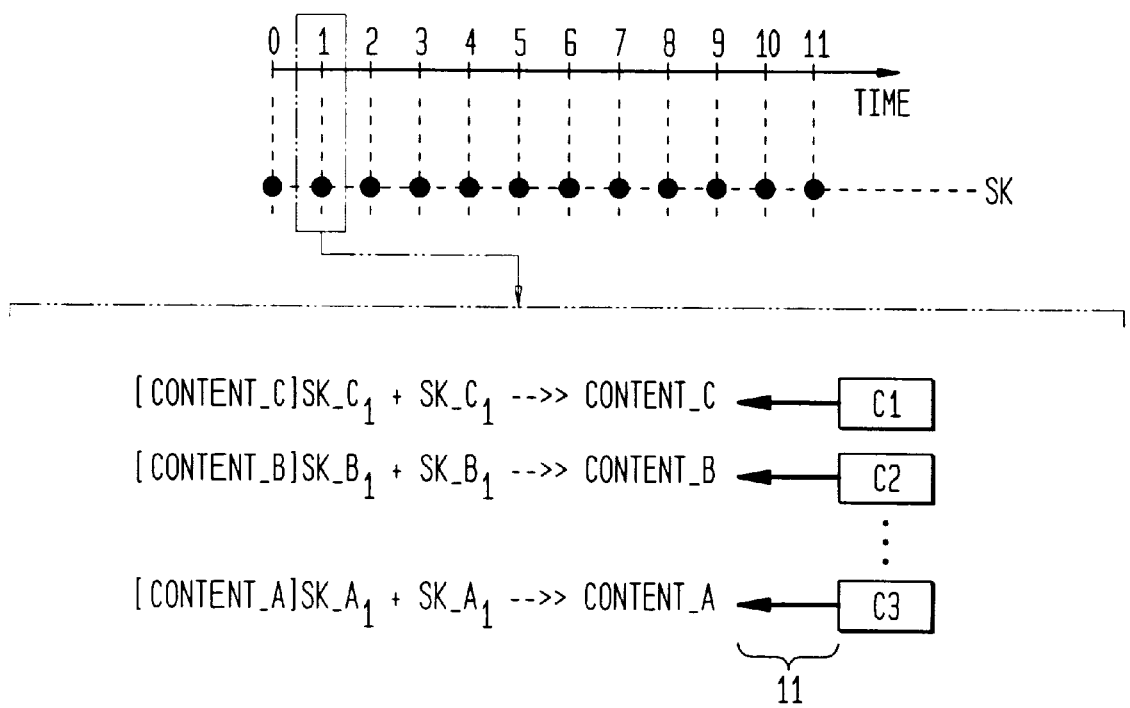
FIG. 7 illustrates the decryption process for the CONTENTs of FIG. 5.

Then, at time 1, the keys change, as indicated by symbols 23 in FIG. 6. Prior to this time, each customer receives new keys, as indicated by symbols 24. From time 1 to time 2, each customer's decoder performs the decryption process indicated by arrows 11 in FIG. 7.

One disadvantage of this approach is that the traffic on the out-of-band channel has increased significantly. Keys must be delivered to customers for every change, indicated by a dot 21, either just prior to a key change, or farther in advance.

THIRD FORM OF INVENTION

The key, SK, is itself encrypted using another key, PK. That is, each customer receives two data words, namely, 1. [SK]PK, which is the key SK, encrypted using another key, PK, which is an acronym for Program Key, and
2. [PK]CUSTOMER_CODE, which is the key PK, encrypted using the CUSTOMER_CODE, which was described above.

Figure 8:
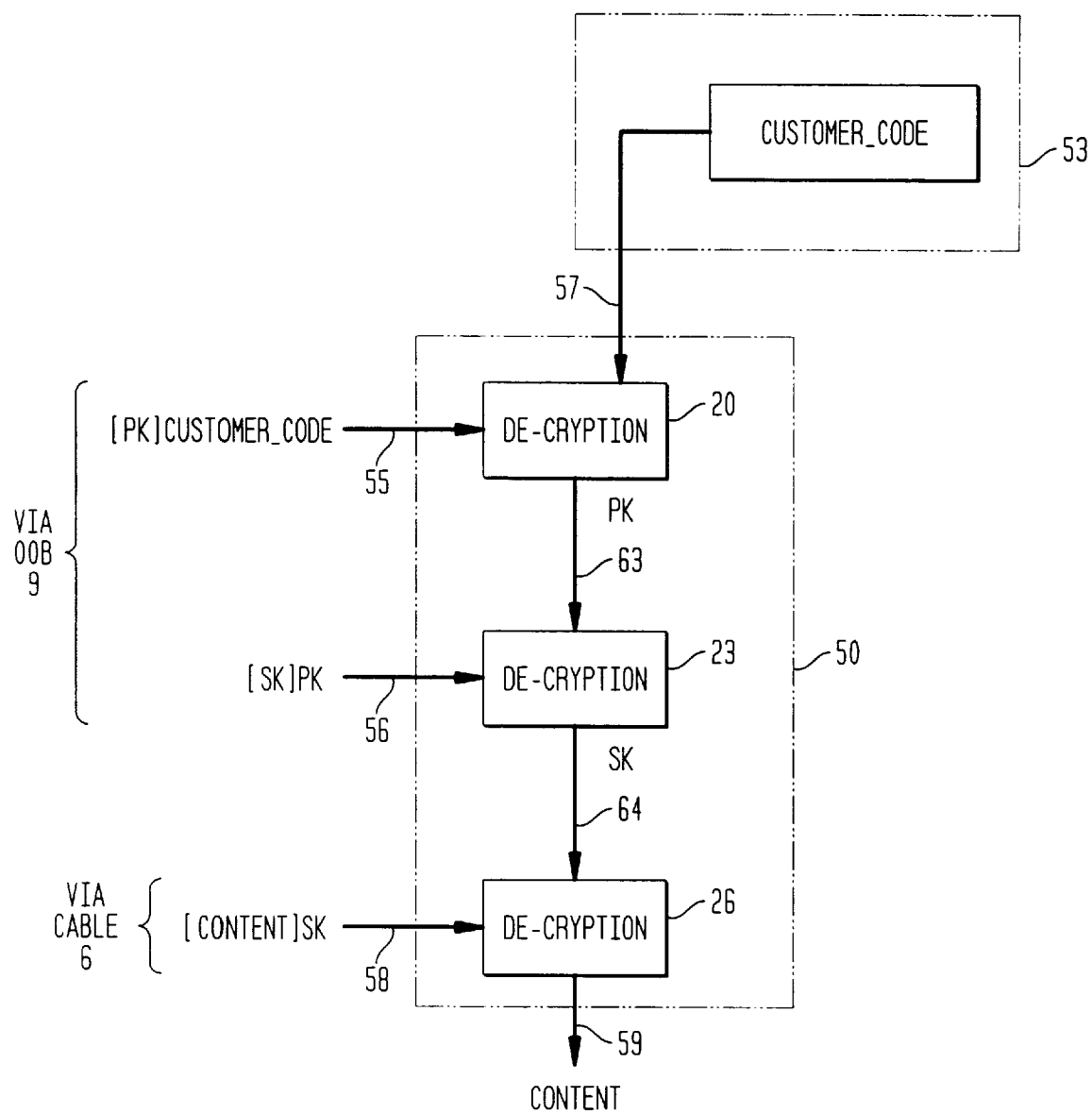
FIG. 8 illustrates hardware which can execute the decryption process.

FIG. 8 illustrates the decryption process occurring at the customer's site. Subscripts have been omitted, for clarity. Both keys SK and PK are delivered by the out-of-band channel 9, as indicated. Key PK is encrypted using CUSTOMER_CODE as a key, as indicated by phrase 55, and is decrypted in block 20, to produce the actual PK, as indicated, on bus 63.

Key SK is encrypted using PK as a key, as indicated by phrase 56, and is decrypted in block 23, using actual PK, on bus 63, to produce actual SK, on bus 64. Actual SK is used by block 26, which also receives encrypted CONTENT, indicated by phrase 58, and block 26 decrypts the encrypted CONTENT, to produce the actual CONTENT on bus 59.

Figure 9:
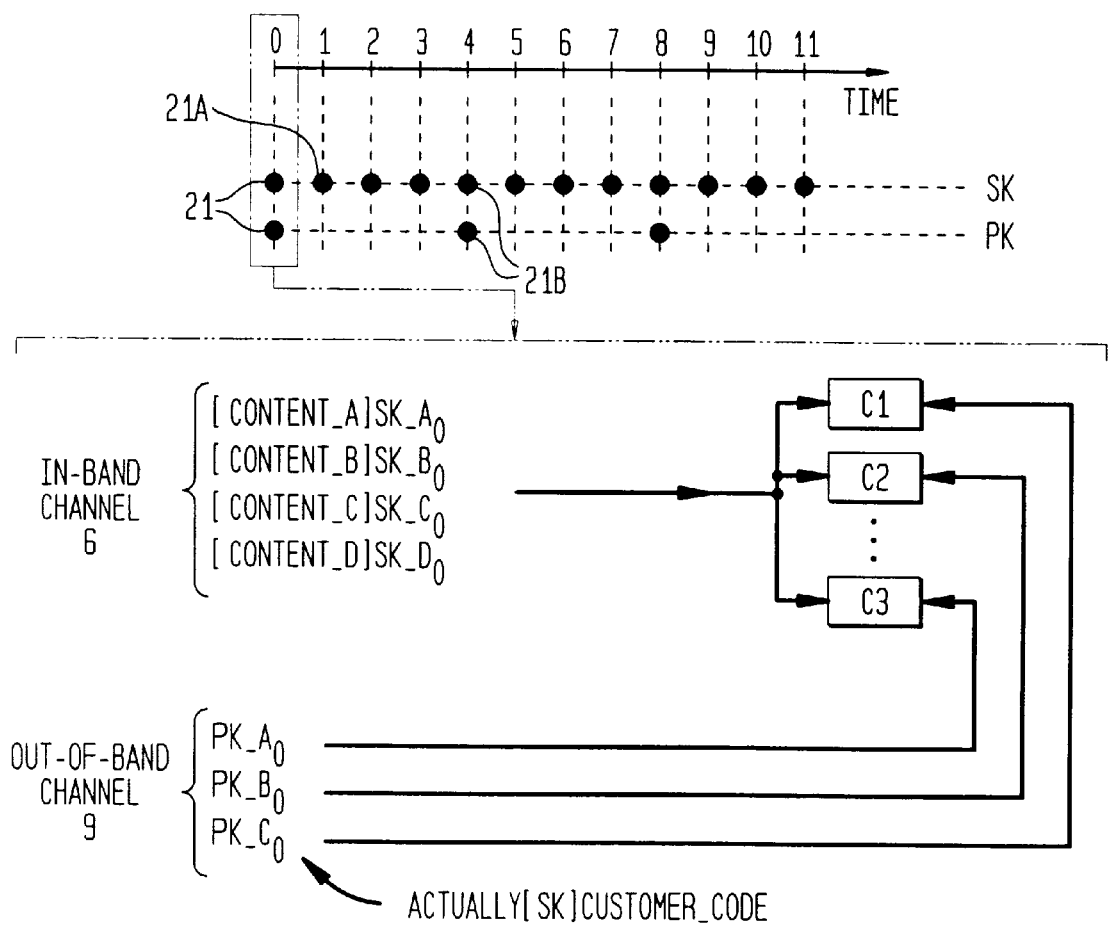
FIG. 9 illustrates encryption of different program CONTENTs by respective keys SK, which change as time progresses, and which themselves are encrypted by keys PK.

The keys SK and PK are changed over time, as indicated by the dots 21 in FIG. 9. Each dot indicates a change. For example, taking customer C3 as representative of the general case, customer C3 receives both $SK\_A_0$ and $PK\_A_0$ for use beginning at time 0. (The decryption needed to obtain PK, performed by block 20 in FIG. 8, is not indicated in FIG. 10, to avoid clutter, and because the key used, CUSTOMER_CODE, does not change.)

Figure 10:
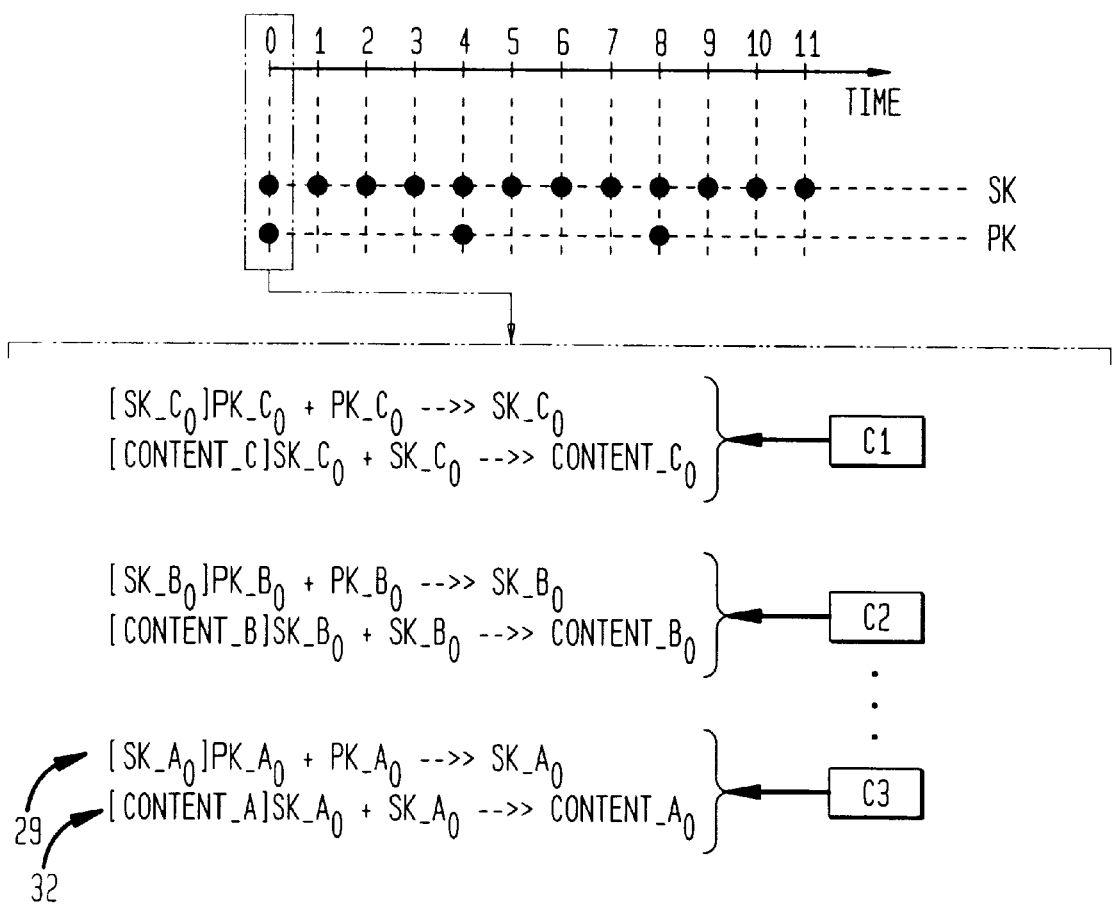
FIG. 10 illustrates the decryption process for the CONTENTs of FIG. 9.

Customer C3 decrypts the CONTENT as indicated in FIG. 10. In this decryption, customer C3 first obtains actual $SK\_A_0$, by the process indicated in expression 29. Then, customer C3 uses this actual $SK\_A_0$ to obtain the CONTENT of program A, by the process indicated in expression 32.

Figure 11:
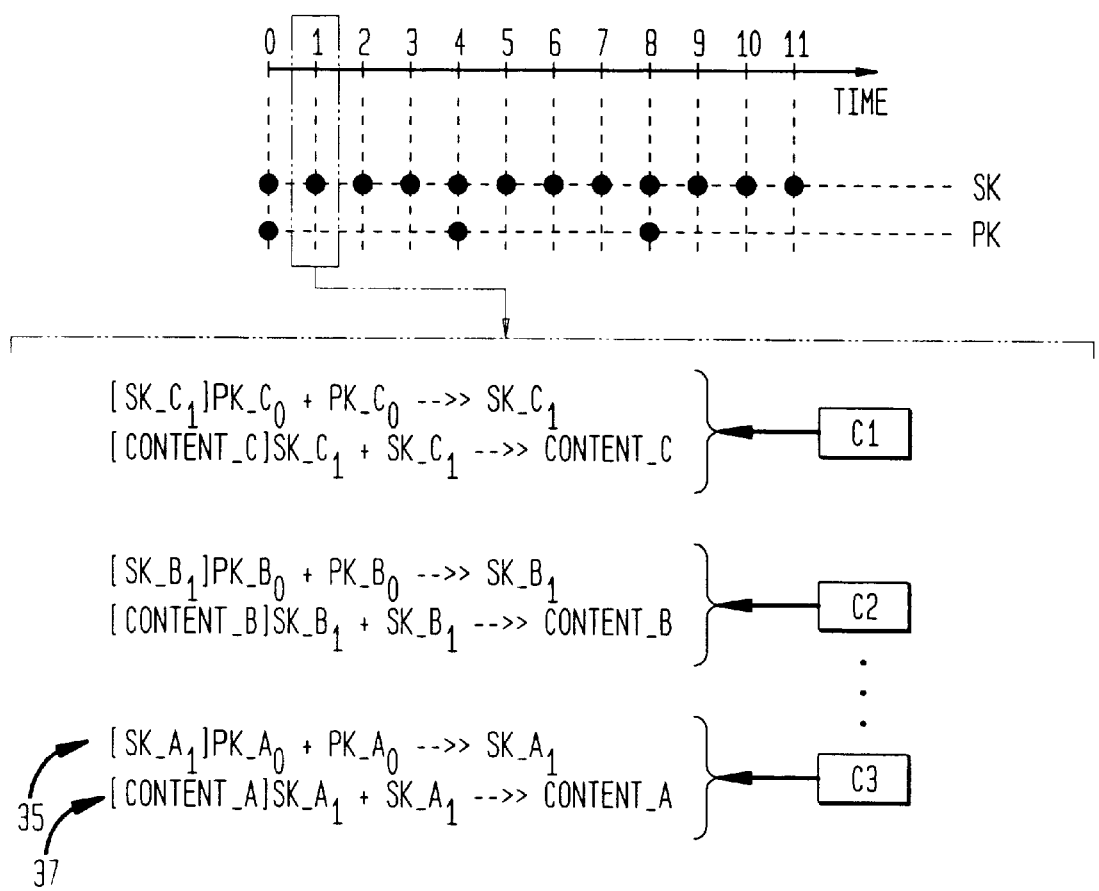
FIG. 11 is similar to FIG. 10, but showing decryption at time t=1.

Then, at time 1, key SK changes, as indicated by dot 21A in FIG. 9, but key PK remains the same, as indicated by an absence of a dot in the "PK-row" in the time-plot in FIG. 9. From time 1 to time 2, customer C3 first obtains the actual, new SK, by process 35 in FIG. 11. Then, using the actual, new SK, customer C3 obtains the CONTENT, by process 37.

Figure 12:
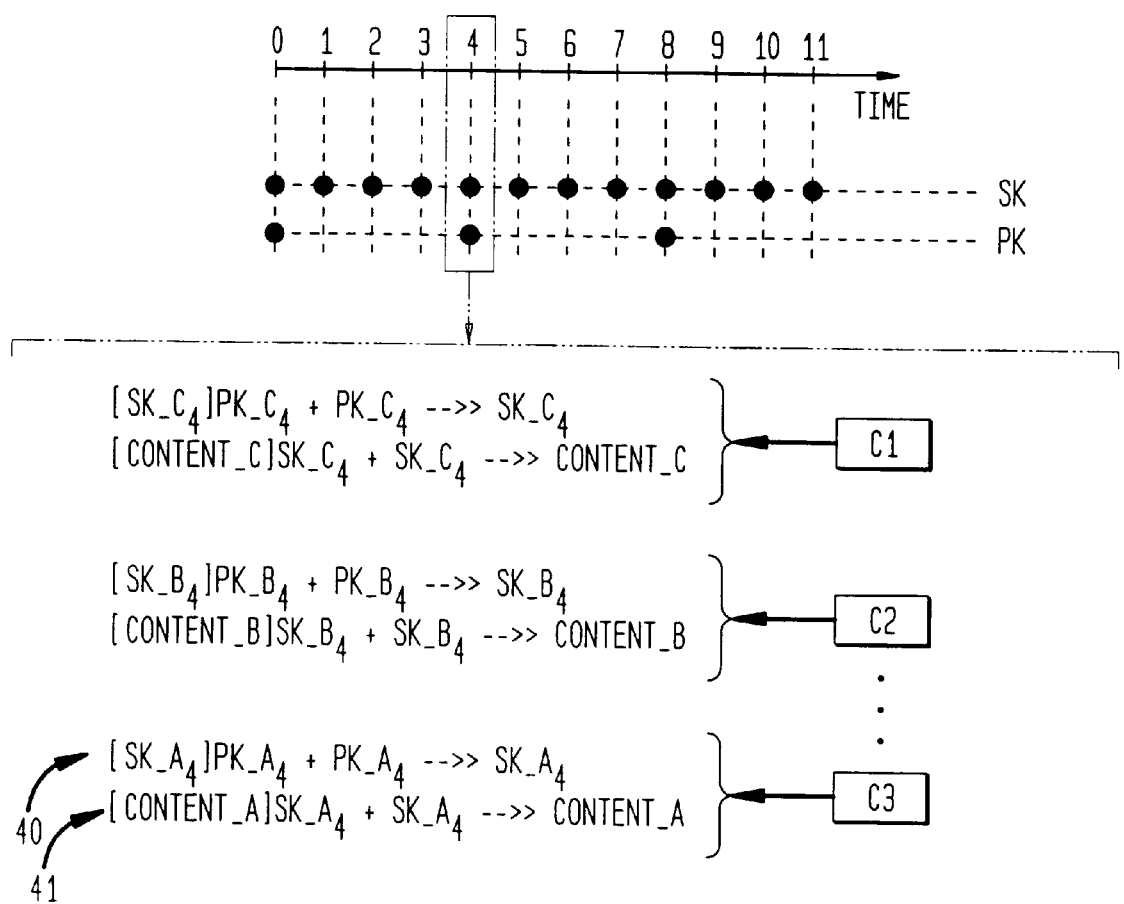
FIG. 12 is similar to FIG. 10, but showing decryption at time t=4.

At time 4 in FIG. 9, both keys SK and PK change, as indicated by dots 21B. Customer C3 de-codes the keys and the CONTENT by processes 40 and 41 in FIG. 12.

Figure 13:
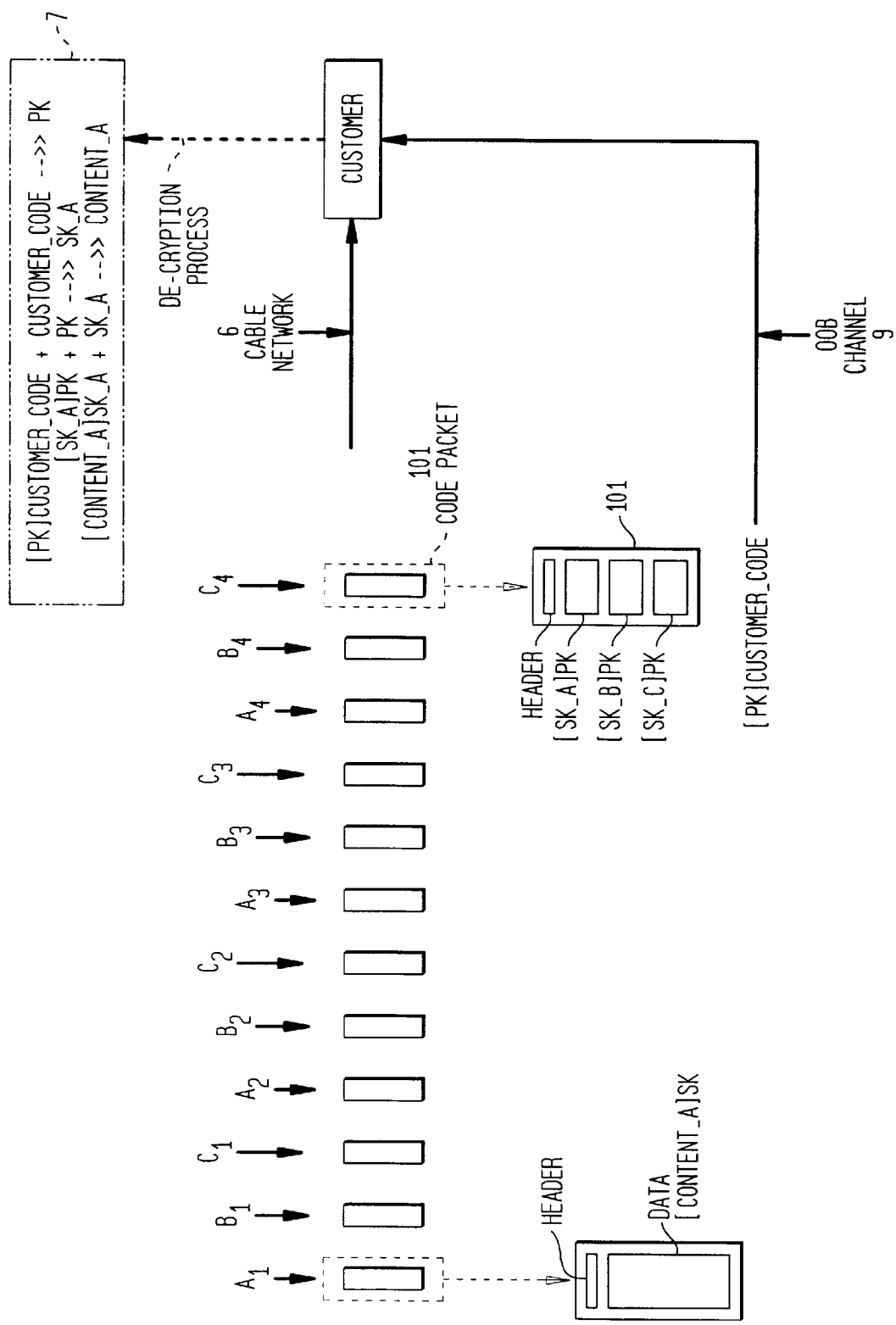
FIG. 13 illustrates transmission of various keys within a data packet, which is similar to the data packets carrying cipher text of program material.

FIG. 13 illustrates this form of the invention, but from a different perspective. The data packets (e.g., $A_1$, $B_1$, $C_1$, etc.) are delivered on the cable network 6. Interspersed with the data packets are code packets 101, which contain encrypted keys, such as [SK_A]PK, which is the key for program A, encrypted using PK as a key. (Subscripts indicating time are not shown.)

The code packets contain a header, as indicated, which identifies the packet as a code packet. The customer's decoder (not shown) identifies the code packets, by reading the headers, and obtains the relevant information from the code packets.

The key [PK]CUSTOMER_CODE, which is the key PK encrypted using CUSTOMER_CODE as a key, is delivered along the out-of-band channel 9. Each customer's decoder performs the decryption process indicated in block 7.

Several significant features of this embodiment are the following. One, by using the PK key to encrypt the actual data encryption keys, SK, the Access Control System no longer is required to encrypt each new value of SK using each customer's unique encryption key. Instead, the value of SK only needs to be encrypted once, using the PK key. This encrypted SK key can then be broadcast to all customers. Every customer in possession of the PK key can decrypt the encrypted SK key, and obtain the new value of SK.

Since the value of PK can change at a much slower rate than the SK keys, say once every 30 days, the amount of traffic on the out-of-band channel is reduced significantly. Also, the Access Control System only needs to process the PK.keys, and not the SK keys, which also reduces the demands placed on it.

Two, the decryption processes indicated by blocks 20, 23, and 26 in FIG. 8 are performed by digital logic contained on a single integrated circuit 50. That is, in a simplified sense, the decryption process can be viewed as a computer program which (1) runs on microprocessors, (2) receives keys 55–57 and encrypted content 58 as input, and (3) produce output 59.

With the process occurring in a single integrated circuit, the data contained on busses 63 and 64 in FIG. 8 never become accessible to the outside world. An attacker cannot read these busses, nor insert data on these busses. Consequently, even if an attacker cracks the encryption scheme, and learns all relevant PK's and SK's, these PK's and SK's cannot be inserted, as data, into the integrated circuit 50.

In order for the PK key to be entered into the decryption hardware, it must be encrypted using the customer's unique encryption key, CUSTOMER_CODE. But this unique encryption key is not available to the customer. This fact prevents the attacker from selling the PK and SK keys, if cracked, to other customers.

That is, without knowledge of the unique encryption key, no customer can encrypt the PK key with the key required to allow its entry into the decryption hardware. (Under normal operation, the PK key is encrypted and delivered to the customer already encrypted by the customer's unique key. Thus, the customer's decryption hardware will accept the PK key, encrypted in this manner. However, since only the Access Control system knows the value of each customer's unique encryption key, only PK keys sent from the Access Control system, and properly encrypted, can be entered into the decryption hardware.)

It is within the skill of the integrated circuit art to produce single-chip integrated circuits which contain a microprocessor and the appropriate programs burned into read-only memory.

From another perspective, the only ports of entry for keys PK and SK are busses 55 and 56. However, these keys must be entered in encrypted form onto these busses. Thus, even if an attacker learns the keys, that is insufficient. To enter PK on bus 55, the attacker must know the CUSTOMER_CODE. This code is extremely well concealed and can change with time, as will be explained later. As an example illustrating concealment, the block containing the CUSTOMER_CODE 53 can be included within integrated circuit 50, in the form of a Programmable, Read-Only Memory (PROM).

FOURTH FORM OF THE INVENTION

Figure 14:
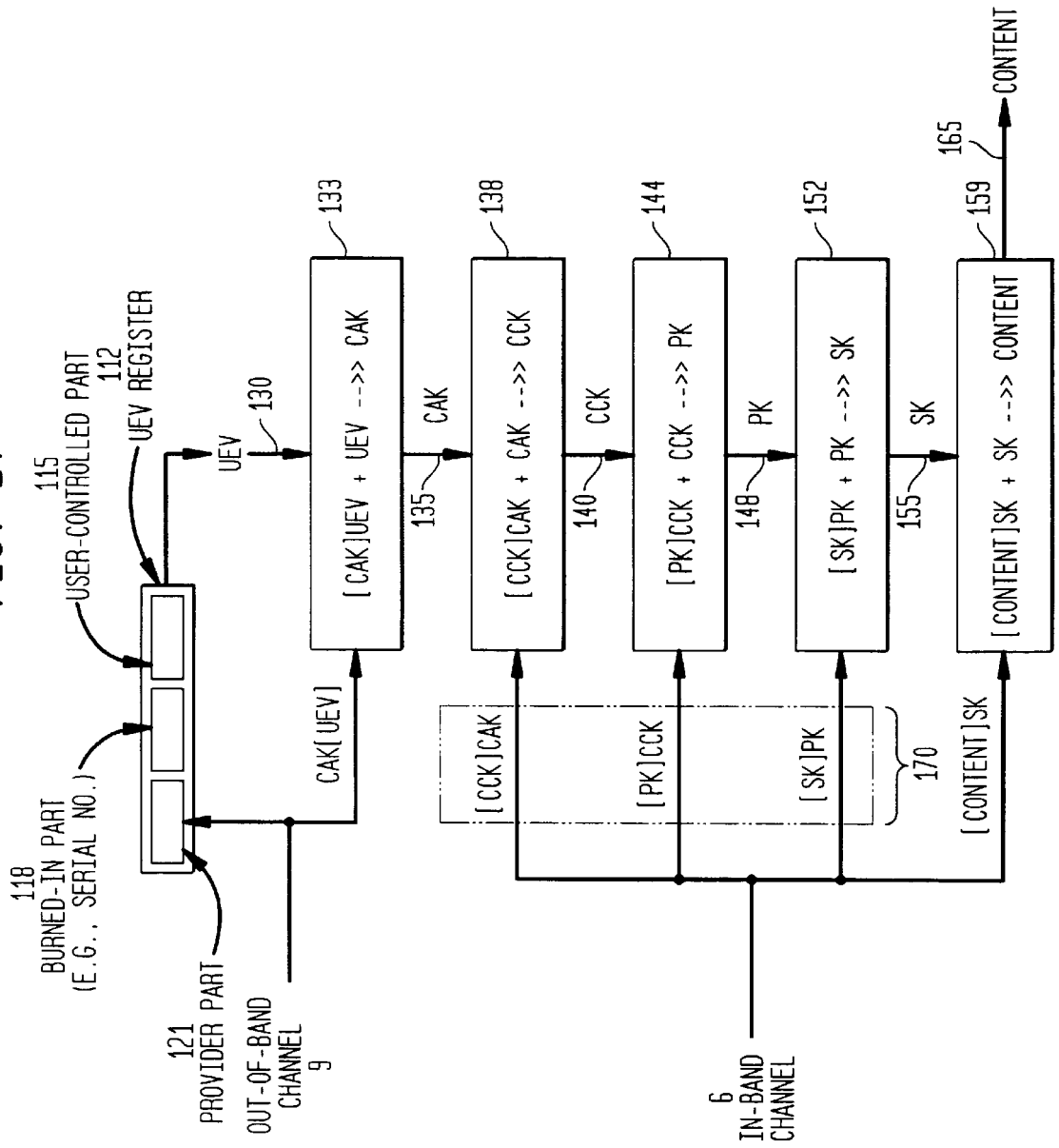
FIG. 14 illustrates hardware which can execute the decryption process.

FIG. 14 illustrates a decryption process undertaken within the customer's decoder (not shown). The CUSTOMER_

CODE is now replaced by a User Encryption Variable, UEV, which is stored in a UEV register 112. This UEV includes one, or more, of the following components:

1. A user-controlled part 115, which is entered by the user, as by DIP switches, punching keys on a keypad, or any other method of data entry.
2. A "burned in part" 118, which is permanently encoded into digital logic, as by pre-programming read-only memory.
3. A provider part 121, which is delivered by the provider of television service, on the out-of-band channel 9.

The UEV register 112 thus holds a key, UEV, which is provided to block 133, on bus 130.

Block 133 decrypts the data [CAK]UEV, using UEV, to produce a key CAK, Channel Access Key, on bus 135. This key, CAK, is fed to block 138, and is used to produce CCK, Control Channel Key, on bus 140. This key, CCK, is fed to block 144, and is used to produce PK, Program Key, on bus 148. This key, PK, is fed to block 152, and is used to produce SK, Segment Key, on bus 155. This key, SK, is fed to block 159, and is used to produce CONTENT, as indicated.

Figure 15:
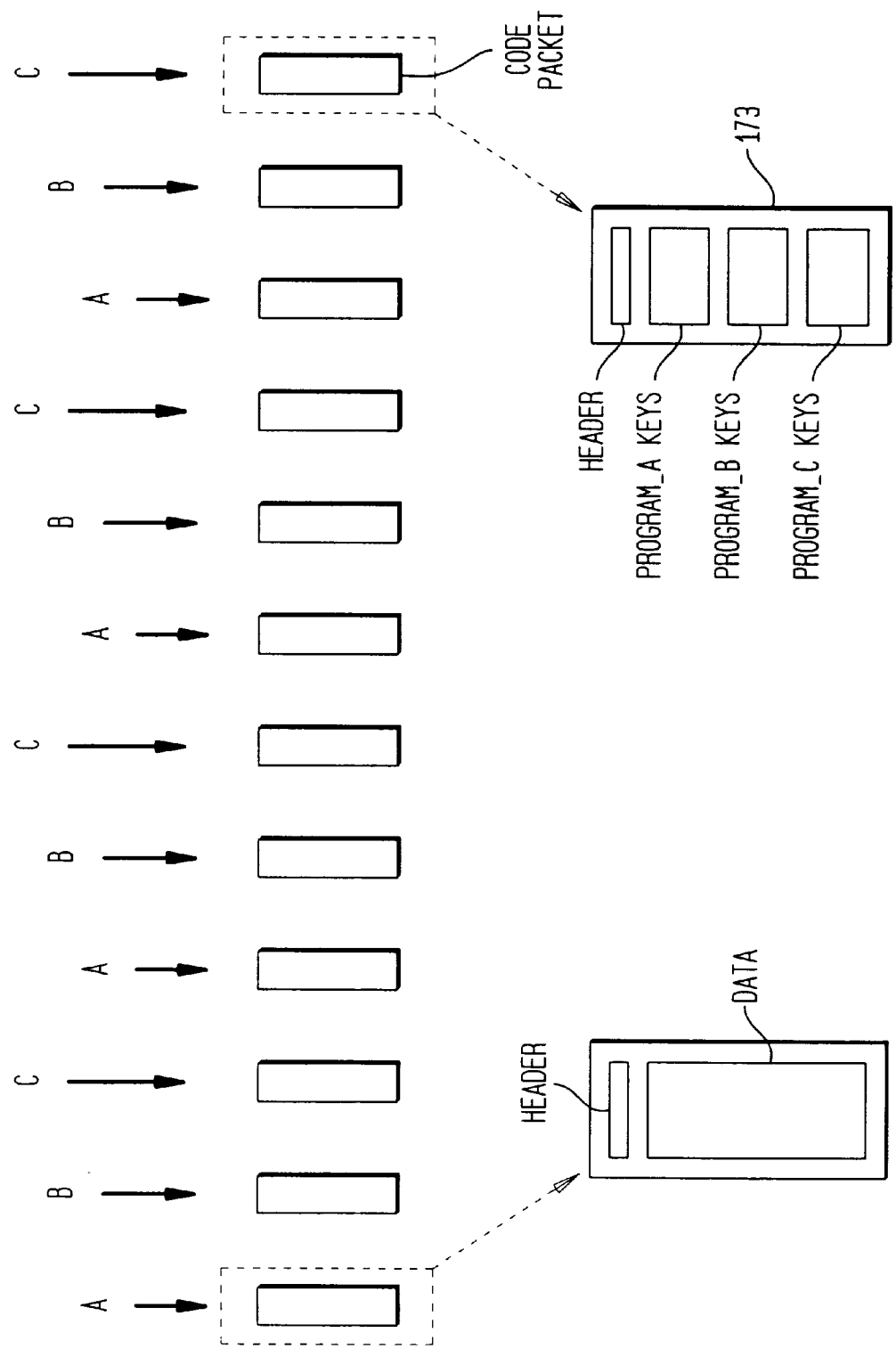
FIG. 15 illustrates a CODE PACKET, as described in FIG. 13, which is interspersed within cipher text packets for three programs, A, B, and C.

The group of keys 170, encrypted, are delivered via the in-band channel 6, as indicated in FIG. 14. They are contained within their own code packet 173 in FIG. 15, which is interspersed within the data packets, as indicated.

In this approach, a dedicated decryption control channel has been constructed, by using a small amount of the bandwidth previously reserved for delivering the actual programming content. For a customer to obtain access to data carried by this dedicated channel, the customer must obtain the Control Channel Key, hence explaining the term CCK for Control Channel Key.

Figure 15A:
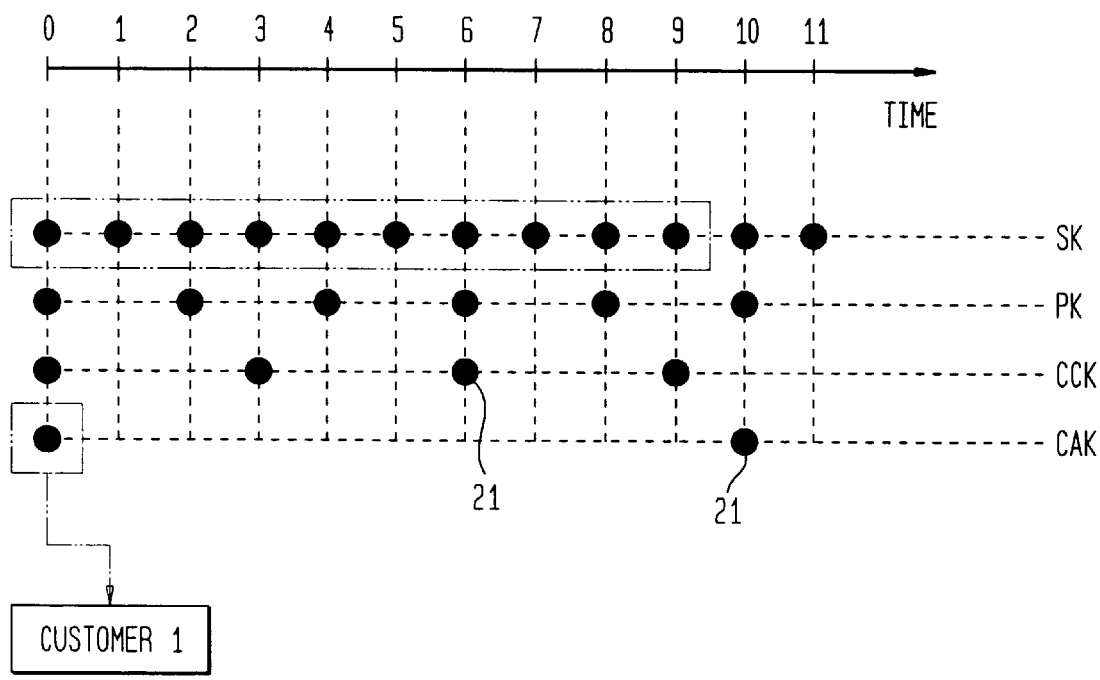
FIG. 15A illustrates a hierarchy of keys, CAK, CCK, PK, and SK, with dots indicating times of change of each.

All keys, except UEV (which may also change, as discussed later), change as time progresses, and one mode of change is indicated in FIG. 15A. Each dot 21 indicates a change.

Figure 16:
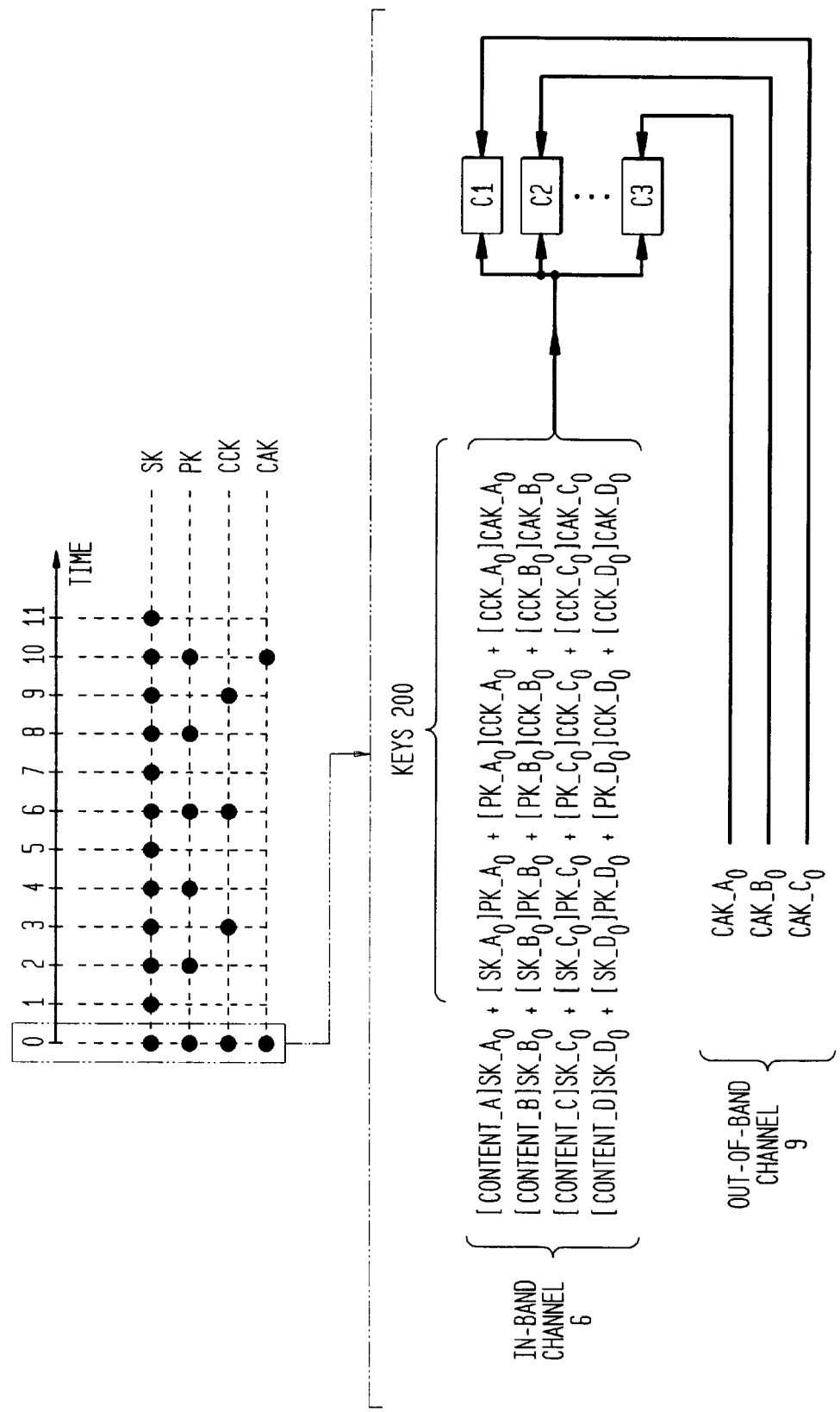
FIG. 16 illustrates encrypted material, and encrypted keys, transmitted to customers C1, C2 . . . C3, together with other keys transmitted in an out-of-band channel, OOB, at time t=0.

FIGS. 16–23 illustrate operation of the embodiment under consideration. In FIG. 16, at time 0, the in-band channel 6 carries the following:

1. CONTENT for programs A through D, but encrypted using respective keys $SK\_A_0$ through $SK\_D_0$. The subscript "0" indicates the last time-of-change of the key, namely, time 0.
2. Keys 200, encrypted:
    a) $SK\_A_0$ refers to the Segment Key for program A.
    b) $PK\_A_0$ refers to the Program Key for program A.
    c) $CCK\_A_0$ refers to the Control Channel Key for Program A.
    d) $CAK\_A_0$ refers to the Channel Access Key for program A.

The subscript "0" refers to the last time-of-change of each, namely, time 0.

The out-of-band channel 9 carries the CAK's which changed at time 0.

The encrypted CONTENT, for all programs, and the keys 200 are carried by the in-band channel, and are received in common by all customers who are tuned to the channel carrying the programming material.

A distinction should be drawn between the in-band channel and the out-of band channel. All customers receive the out-of-band channel, all the time. Their set-top-boxes contain a fixed tuner that is set to the frequency of the out-of-band channel. In contrast, the in-band channel is only received by those customers who are tuned to the frequency of the in-band channel. Of course, these customers can change the in-band channel to which they tune.

Figure 17:
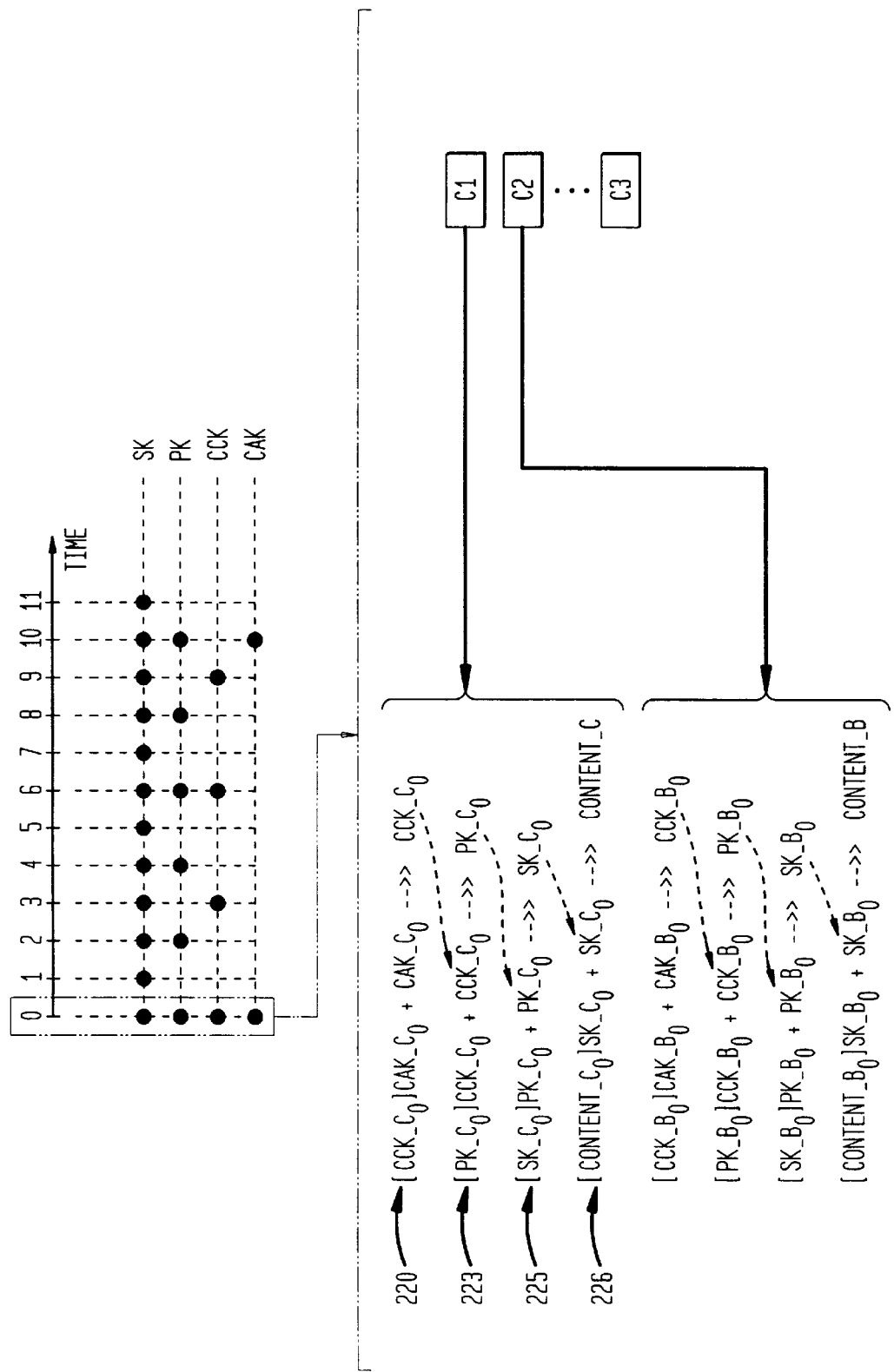
FIG. 17 illustrates a decryption process, for the material of FIG. 16, at time t=0.

FIG. 17 illustrates the decryption process undertaken by the decoders of two representative customers. Customer C1 obtains $CCK\_C_0$ by process 220, then $PK\_C_0$ by process 223, then $SK\_C_0$ by process 225, then $CONTENT\_C$ by process 226. The dashed arrows indicate correspondence between a key derived in a previous process, and its use in a later process. Customer C2 follows the same pattern.

Figure 18:
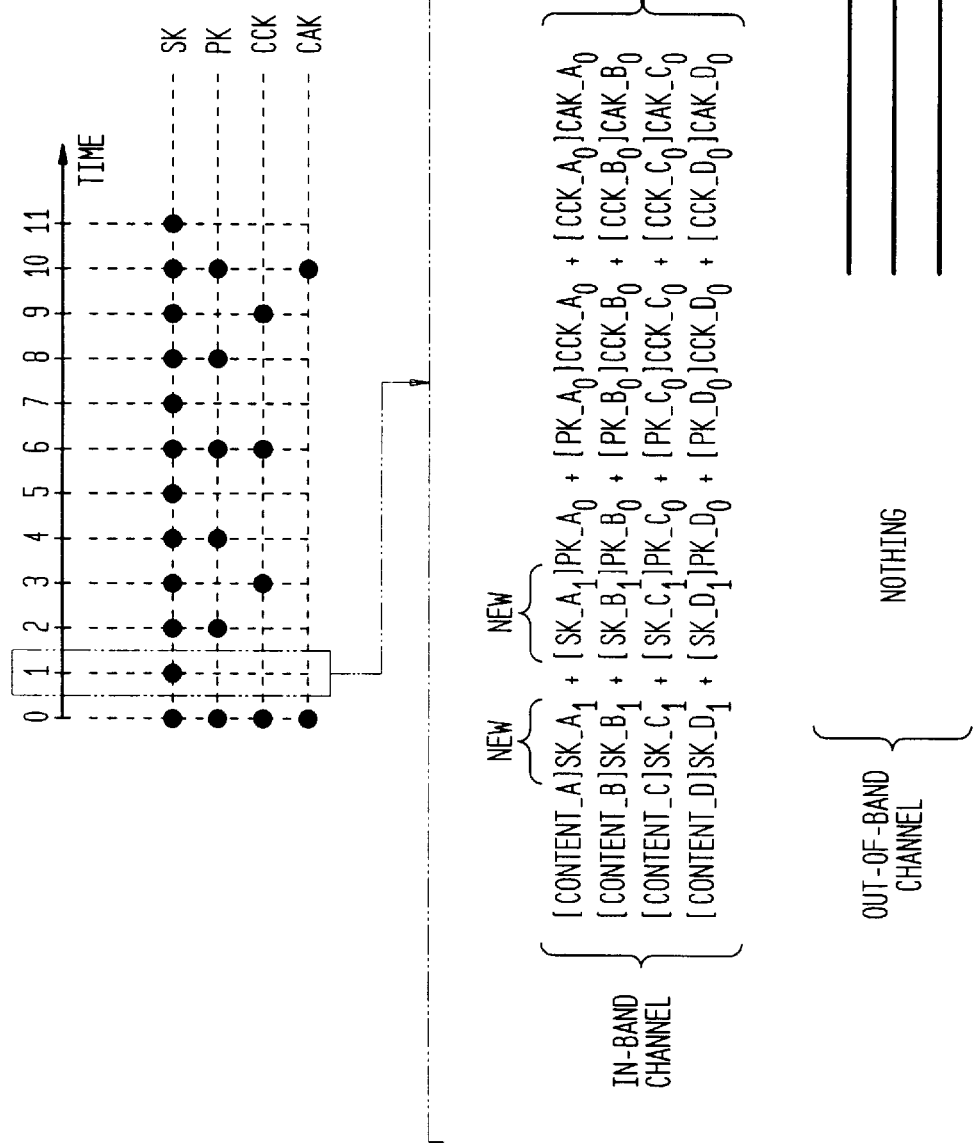
FIG. 18 is similar to FIG. 16, but for time t=1.

FIG. 18 illustrates a change of SK at time 1. SK, for all programs, changes as indicated by the columns labeled "NEW."

Figure 19:
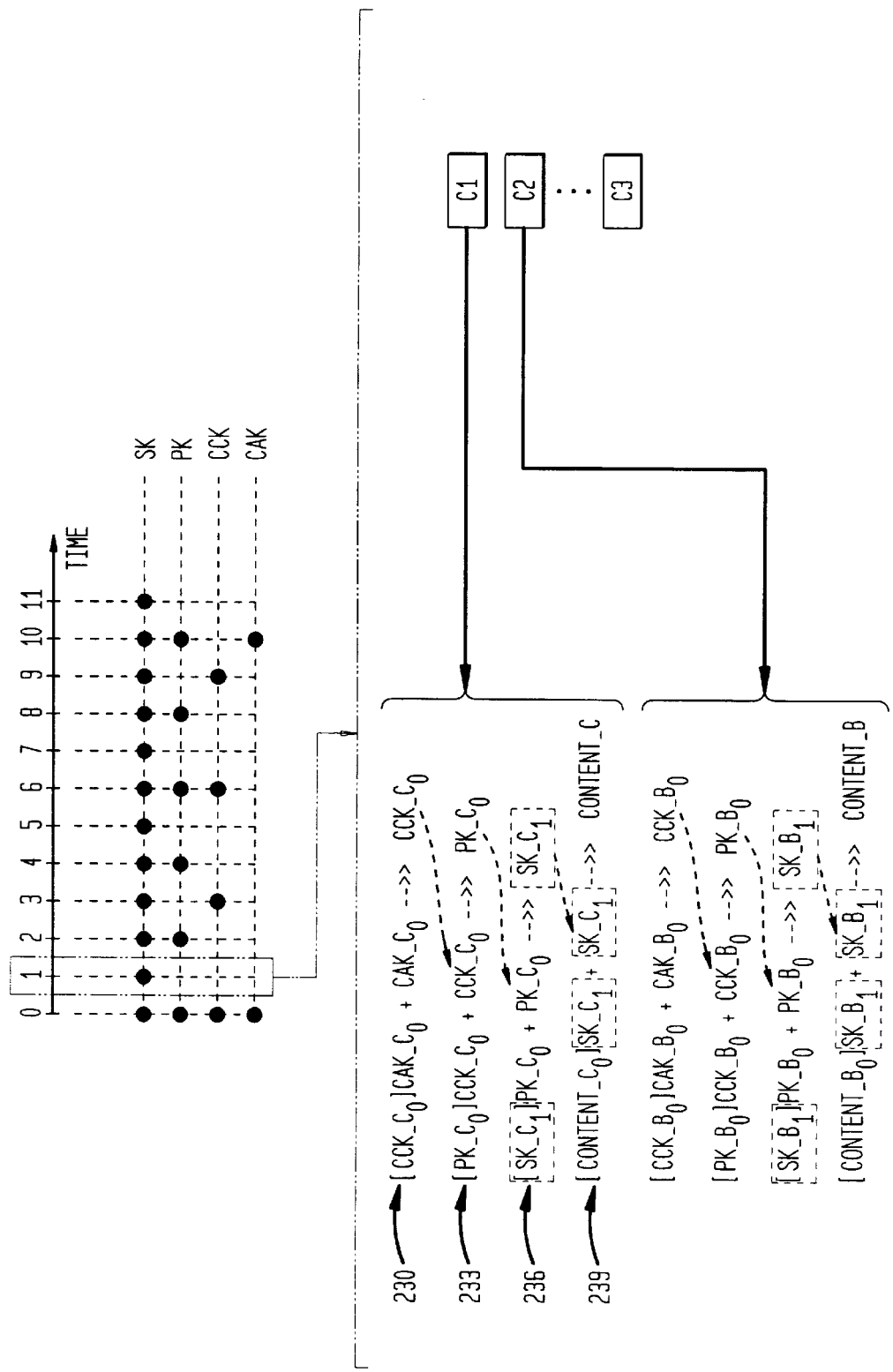
FIG. 19 is similar to FIG. 17, but for time t=1.

FIG. 19 illustrates the decryption process undertaken by the decoders of two representative customers. Customer C1 obtains $CCK\_C_0$ by process 230, then $PK\_C_0$ by process 233, then $SK\_C_1$ by process 236, then $CONTENT\_C$ by process 239. The keys contained within the dashed boxes indicate keys which have changed since time 0. Customer C2 follows a similar pattern.

FIG. 20 illustrates a change of both SK and PK at time 2. These keys, SK and PK, change for all programs, as indicated by the columns labeled "NEW."

Figure 21:
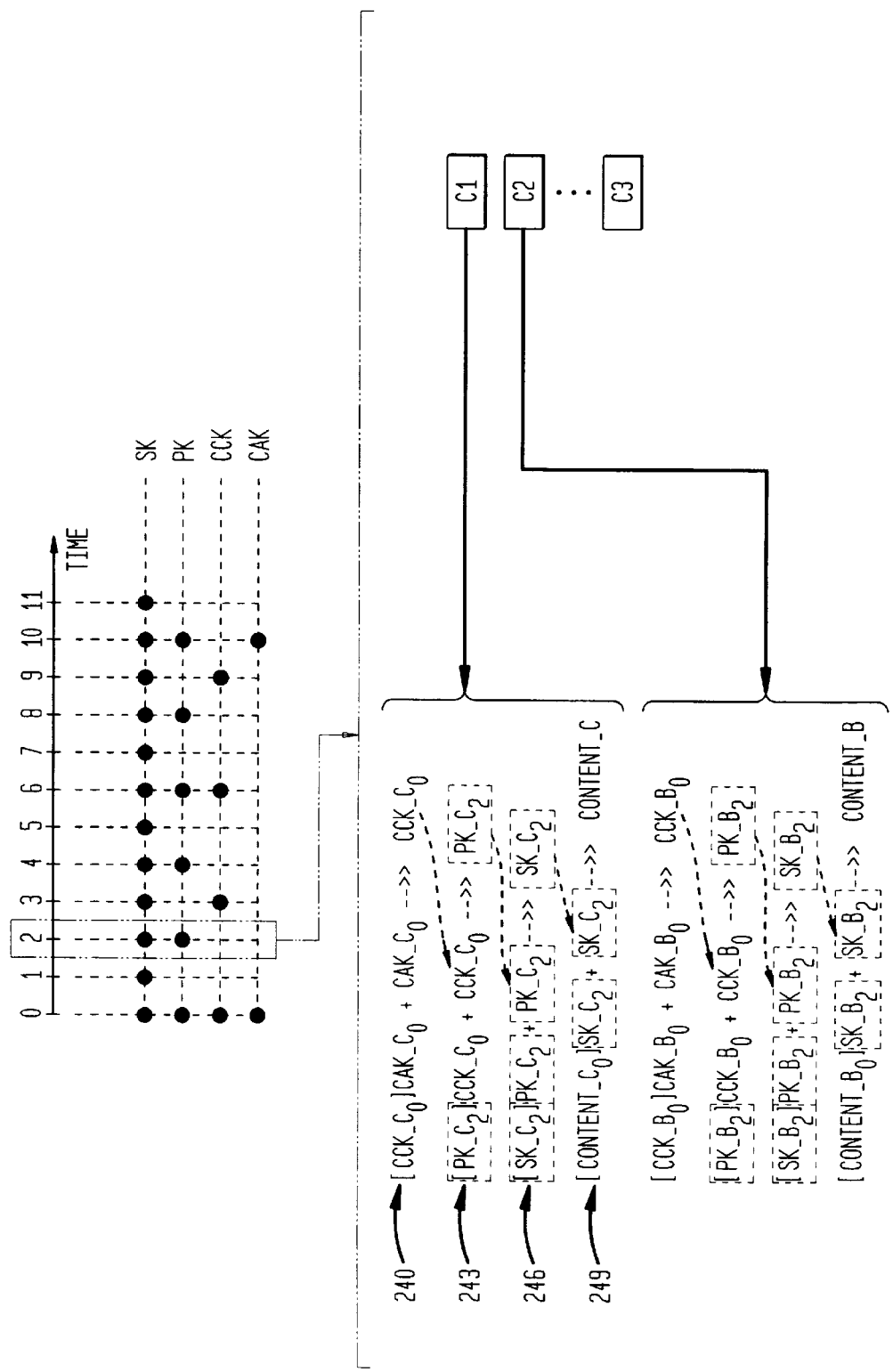
FIG. 21 is similar to FIG. 19, but for time t=2.

FIG. 21 illustrates the decryption process undertaken by the decoders of two representative customers. Customer C1 obtains $CCK\_C_0$ by process 240, then $PK\_C_2$ by process 243, then $SK\_C_2$ by process 246, then $CONTENT\_C$ by process 249. The keys contained within the dashed boxes indicate keys which have changed since time 0. Customer C2 follows a similar pattern.

FIG. 22 illustrates a change of both SK and CCK at time 3. These keys, SK and CCK, change for all programs, as indicated by the columns labeled "NEW."

Figure 23:
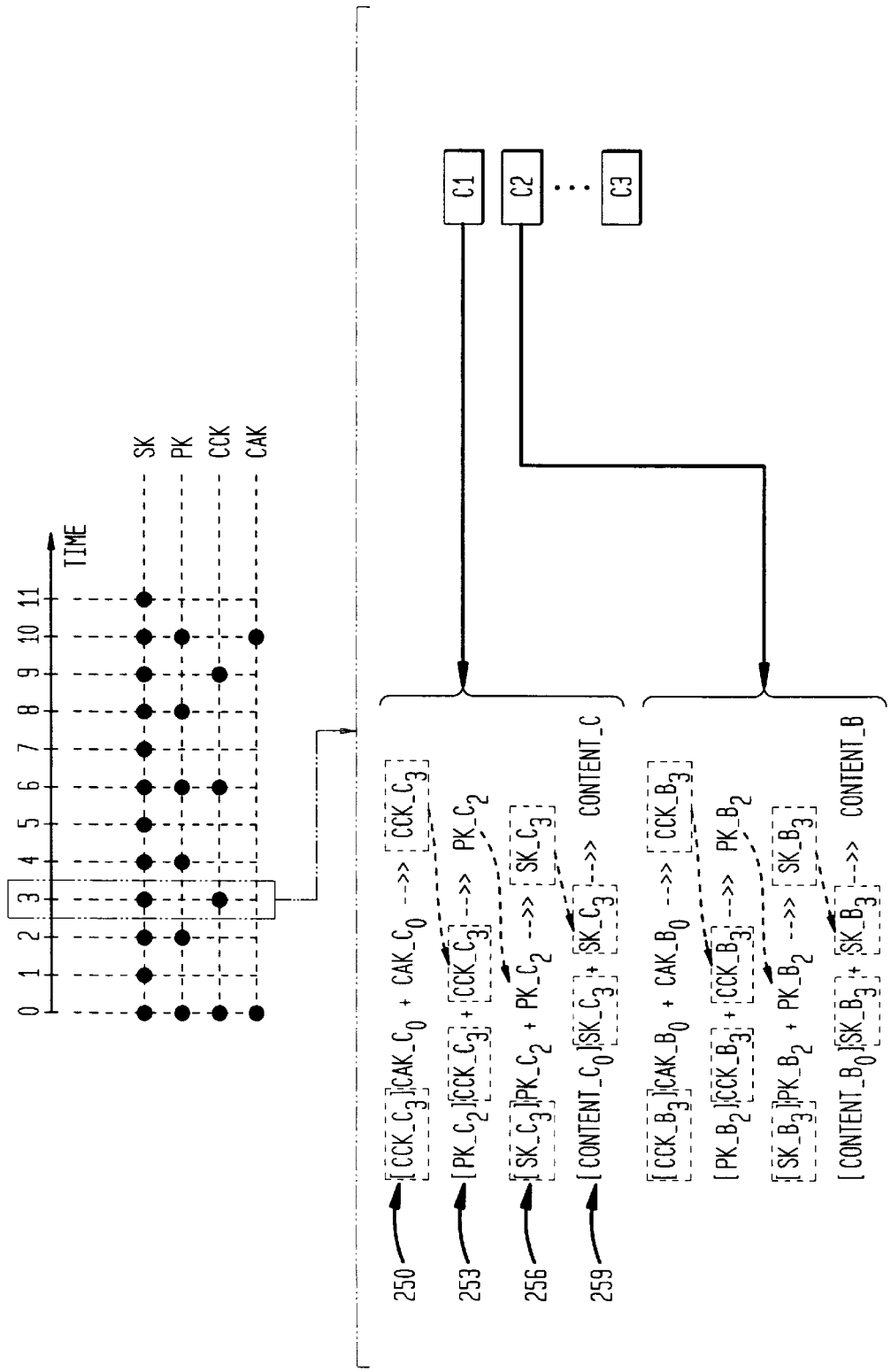
FIG. 23 is similar to FIG. 19, but for time t=3.

FIG. 23 illustrates the decryption process undertaken by the decoders of two representative customers. Customer C1 obtains $CCK\_C_3$ by process 250, then $PK\_C_2$ by process 253, then $SK\_C_3$ by process 256, then $CONTENT\_C$ by process 249. The keys contained within the dashed boxes indicate keys which have changed since time 0. Customer C2 follows a similar pattern.

In FIGS. 18, 20, and 22, the out-of-band channel 9 is indicated as carrying nothing, because, as indicated in FIG. 14, the out-of-band channel carried CAK, which only changed at time 0, which is indicated in FIG. 16.

SIGNIFICANT FEATURES

1. The in-band decryption control channel provides several important features. First, it allows the transmission of new keys directly from the encryption hardware to a customer's decryption hardware, without requiring involvement by the Access Control System.

Second, it allows the encryption hardware to assume the task of generating all the keys used in the encryption operation (SK, PK, and CCK). Only the CAK keys are generated external to the encryption hardware. The keys SK, PK, and CCK, are generated within the encryption device, in a silicon chip (or equivalent), and are never exposed outside the chip.

Thus, the values of these keys are never exposed and remain unknown to everyone. Only the physical hardware "knows" the values of these encryption keys. Using the in-band channel, these keys are sent directly to the integrated circuit contained in the customer's decryption hardware, and are only decrypted after they are loaded into the chip. Thus, at the customer's end, only the physical hardware "knows" the value of these keys.

2. The invention allows individual programs, offered by individual program providers, to be collected into groups, or packages, in any possible combination, and the packages to be sold separately to customers. The packages can overlap as to content. An example will illustrate this packaging, but first, as background, a recapitulation of some principles explained above will be given.

The keys in FIG. 14 are each assigned a rank. The ranking order is CAK, CCK, PK, and then SK, with CAK as highest rank, and SK as lowest rank. Any higher-ranked key allows attainment of any lower-ranked key. That is:

possession of CAK allows attainment of CCK, PK, and SK;

possession of CCK (of second rank) allows attainment of PK and SK, but not CAK, which is higher-ranked; and possession of PK (of third rank) allows attainment of SK, but not CAK or CCK, which are both higher-ranked.

Figure 24:
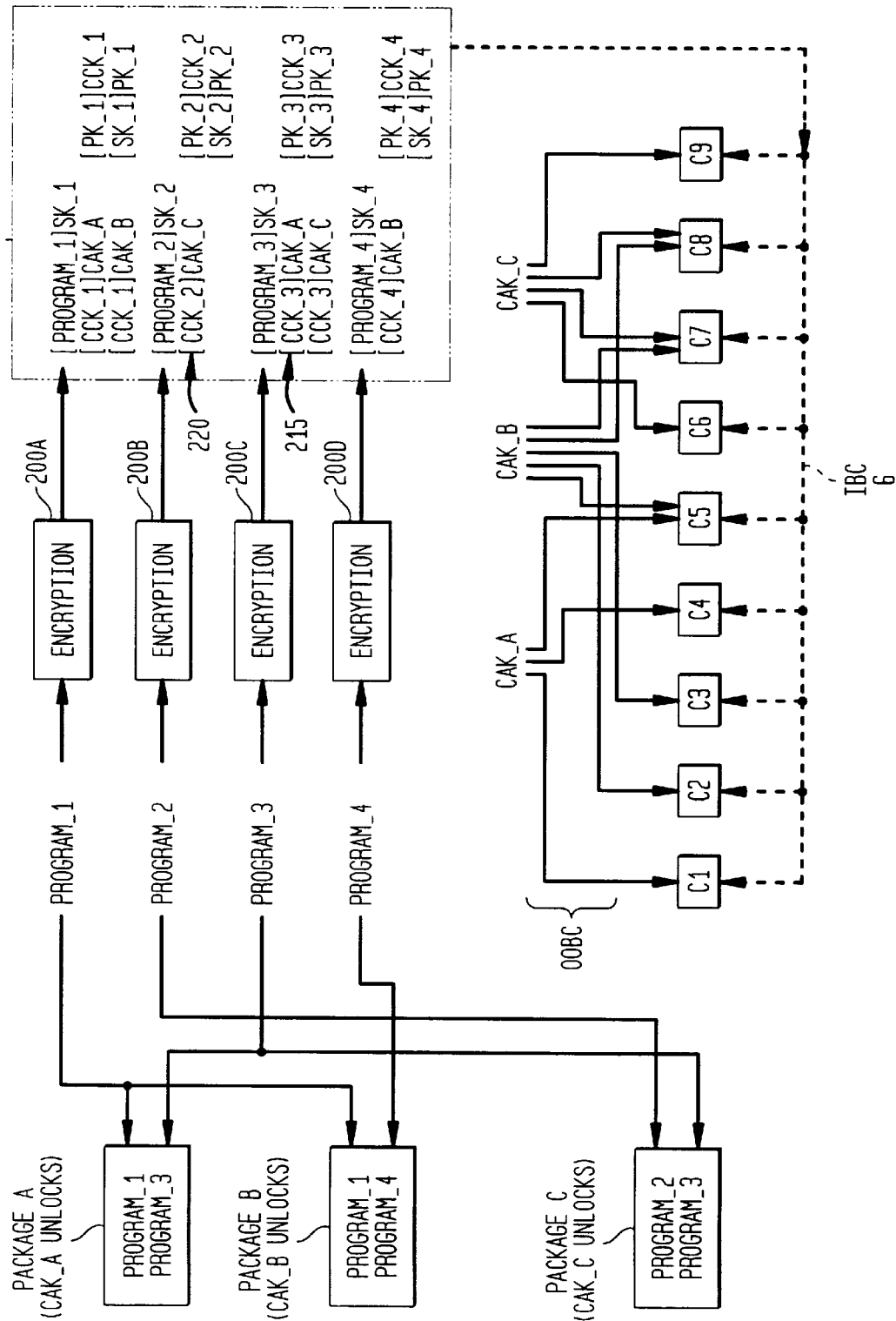
FIG. 24 illustrates combining programs taken from a group of four programs into different packages.

Returning to packaging of programs: in FIG. 24, upper part, four programs, PROGRAM_1 through PROGRAM_4, are shown. Assume that these four programs are grouped into the three packages, A through C, shown at the left of the Figure. Customers C1 C3 in FIG. 16 purchase their respective packages. The invention allows the customers to gain access to the programs within a package, by using a single Channel Access Key, CAK. CAK is delivered to the customers through the out-of-band channel 9, indicated in FIG. 14.

In particular, regarding access to the programs, as indicated in FIG. 24, left side:

CAK_A allows access to the programs in PACKAGE A, namely, PROGRAM_1 and PROGRAM_3;

CAK_B allows access to the programs in PACKAGE B, namely, PROGRAM_1 and PROGRAM_4; and CAK_C allows access to the programs in PACKAGE C, namely, PROGRAM_2 and PROGRAM_3.

This mode of access is allowed by the keys produced by the encryption processes executed by encryptors 200, shown at the upper right of FIG. 24, based on the following features of the invention.

All programs undergo encryption processes, indicated by blocks 200. (The encryption processes may be undertaken by a discrete encryptor, dedicated to its own program, or multiple programs may be encrypted by a single, more powerful encryptor.) The encryption process assigns each program its own CCK (which will change over time, as discussed above). For example, PROGRAM_1 is assigned CCK_1, and PROGRAM_2 is assigned CCK_2, as indicated.

The CCKs, of course, are the appropriate CCKs to obtain the necessary, lower-ranked, PKs and SKs. In general, SK, PK, and CCK are random numbers. Again, the generation, assignment, and use of these keys is normally under the direct control of the encryption hardware, with no involvement from the Access Control System, which is external to the encryption hardware. The encryption processes also produce the appropriate [PK]CCK and [SK]PK for each CCK.

Each package (at the left of the Figure) is assigned a channel access key, CAK_A, CAK_B, or CAK_C. Different customers will purchase different packages. The customers are given, via the out-of-band channel 9 in FIG. 14, the appropriate CAKs for their purchased packages.

For example, as indicated at the lower right part of the Figure, customer C1 purchased PACKAGE A, and receives CAK_A; customer C5 purchased both PACKAGE A and PACKAGE B, and receives both CAK_A and CAK_B, as indicated. Every customer can thus obtain access to the package purchased, by using the CAK in the decryption process shown in FIG. 14.

For example, all customers in possession of CAK_A can obtain CCK_1 (for PROGRAM_1) and CCK_3 (for PROGRAM_3), as indicated by block 210. These two programs are contained in PACKAGE A, shown at the upper left of the Figure. Similarly, all customers in possession of CAK_B can obtain CCK_1 (for PROGRAM_1) and CCK_4 (for PROGRAM_4), as indicated by block 210. These two programs are contained in PACKAGE B, shown at the left side of the Figure.

Therefore:

1. Each program is given a CCK by an encryption process. In general, the CCKs are unique.
2. Each program can be assigned to one or more packages. Each package is assigned a key, which is higher-ranked than the CCK. This higher-ranked key, CAK, is used to encrypt the CCKs of all programs assigned to the package. Thus, since (i) each program is assigned a CCK, (ii) each program may be contained in different packages, and (iii) each package encrypts the CCK using a different CAK, each CCK may be encrypted more than once, with different keys (or CAKs).
3. The CAKs for each package are delivered to the proper customers, as through the out-of-band channel.

With this arrangement, each customer can obtain access to all programs contained in the packages which the customer purchased. Those programs may also be contained within other packages. However, the customers cannot obtain access to programs in other packages which are not contained in the packages which the customer purchased.

For example, customer C1 has access to PACKAGE A, containing PROGRAM_1 and PROGRAM_3. PROGRAM_3 is also contained in PACKAGE C. Customer C1 has access to this program, by virtue of access to CCK_3, because of possession of CAK_A. (See line 215 in box 210.) However, customer C1 does not have access to the other program in PACKAGE C, namely, PROGRAM_2, because CCK_2, for PROGRAM_2, is encrypted using CAK_C (see line 220 in block 210). Customer C1 does not own CAK_C.

3. The invention allows another feature to be superimposed upon the structure shown in FIG. 24. Under the invention, access to programs is allowed, only so long as the customers' CAKs are valid. That is, the encryption processes 200 in FIG. 24 will, at times, change the CAKs used to encrypt the CCKs, as explained above in connection with FIGS. 15A–23.

When the CAKs change, the customers must be given the new CAKs. In practice, it is expected that the CAK change will occur in synchrony with the billing period of the cable service provider, and that period will probably be monthly.

Superimposed upon this structure is the ability to allow any customer to obtain access to any individual program, without respect to the monthly CAK-change of other customers. Further, this program may, or may not, be contained in a package whose access is controlled by a CAK. From another perspective, if a monthly CAK allows access to a package which contains this program, then, under the invention, customers can be granted access to the program itself, without the package. Further, the access can be granted without divulging the package's CAK.

Figure 25:
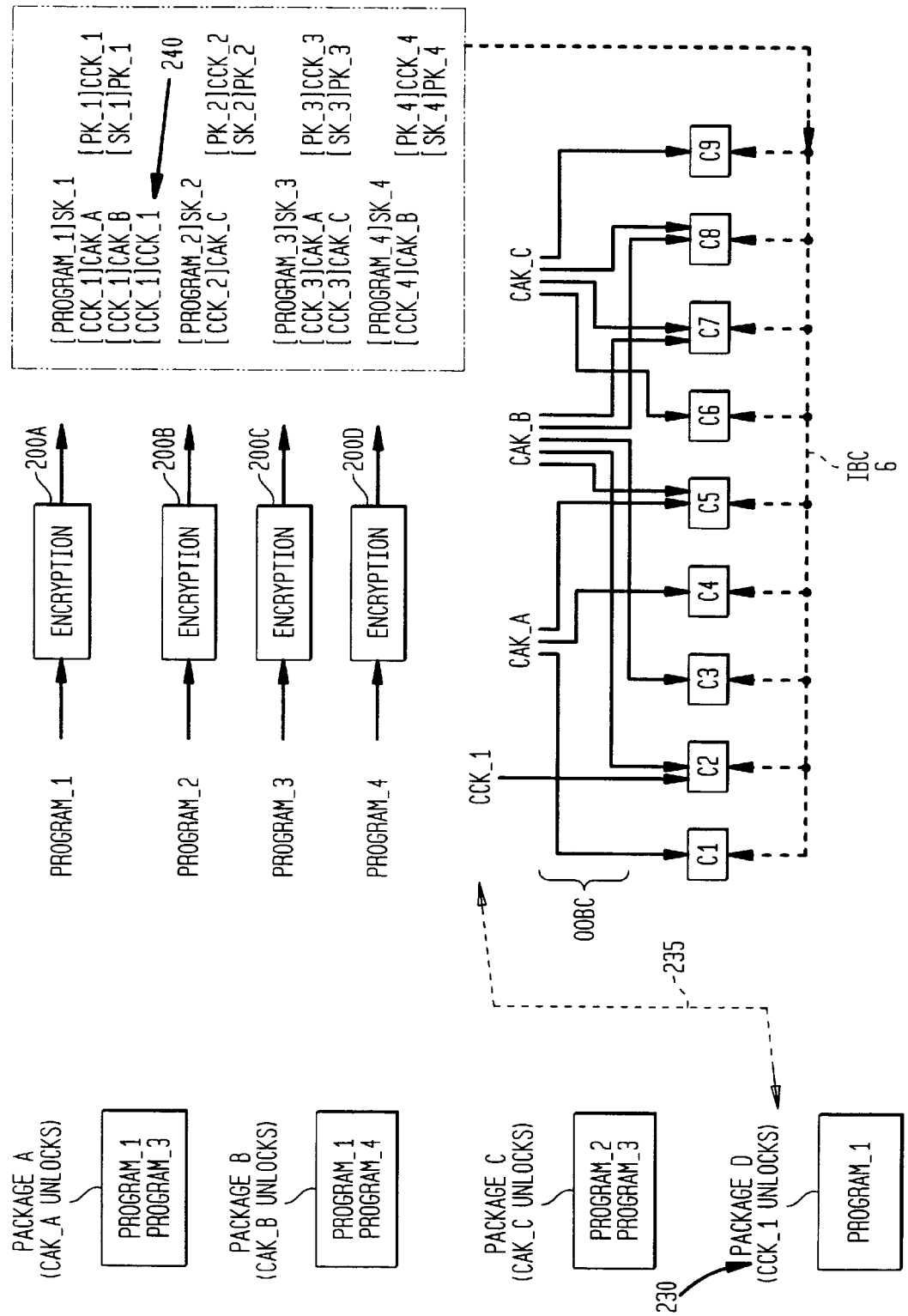
FIG. 25 illustrates treating a single program as an entire package D, and encrypting its CCK by itself.

The invention accomplishes this by treating the single program, to which access is desired, as a separate package, such as PACKAGE D in FIG. 25. PACKAGE D contains PROGRAM_1, which is also contained in PACKAGES_1 and _2, although, in general, as stated above, the program is not required to be contained in other packages.

The invention encrypts CCK_1 (the second-ranked key for the program in question, namely, PROGRAM_1), not by a CAK, but by CCK_1 itself, as indicated by line 240, at the upper right of FIG. 25. This [CCK_1]CCK_1 is treated as a CAK, for purposes of decryption, as will be explained immediately below. Also, CCK_1 is delivered to the customers wishing to obtain restricted access to PROGRAM_ 1, through the Out-Of-Band Channel OOBC, as indicated by arrow 235.

Figure 26:
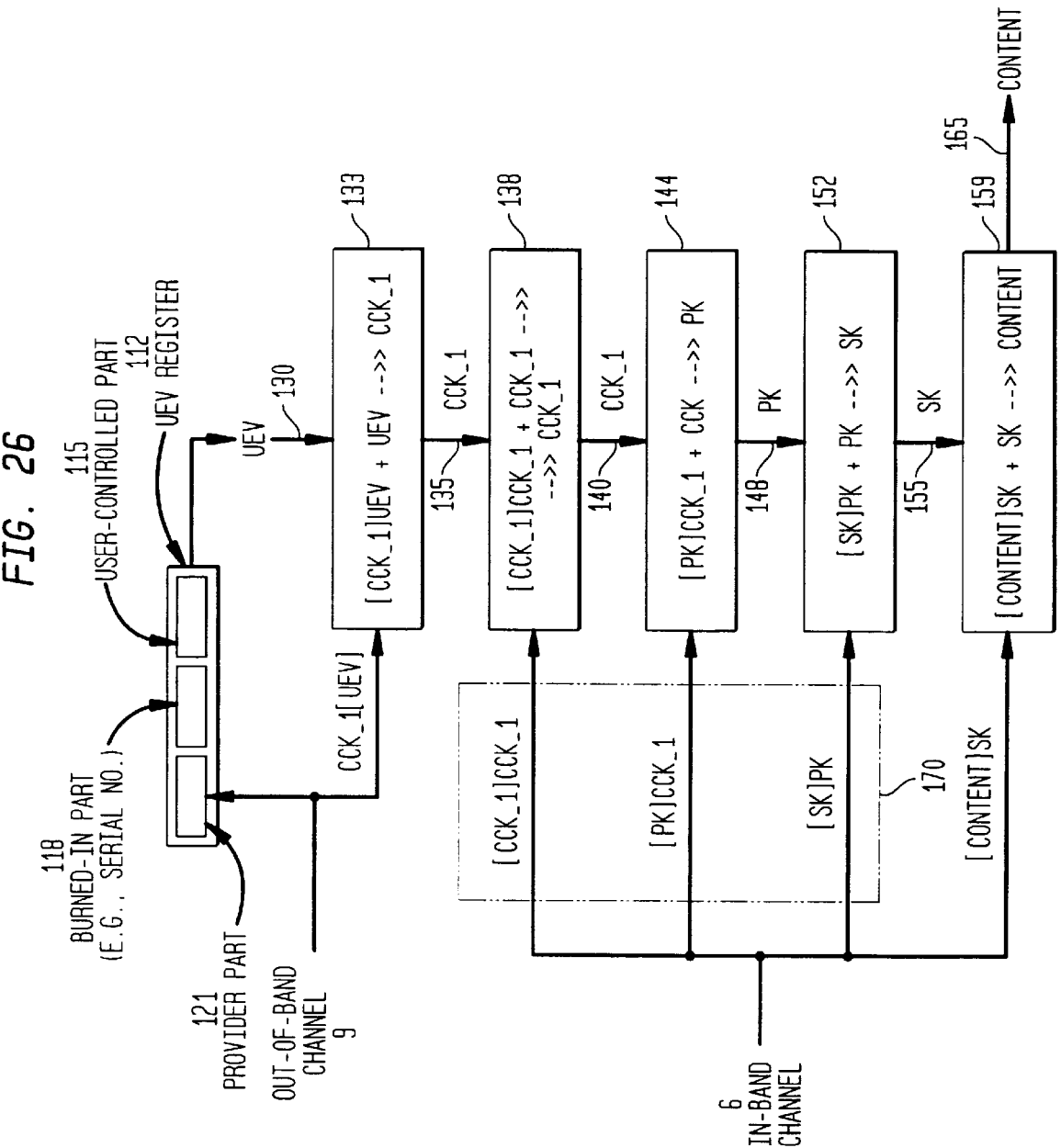
FIG. 26 is similar to FIG. 14, and illustrates how encrypting CCK by itself, as in FIG. 25, can result in decrypting package D.

Specifically, as indicated in FIG. 26, CCK_1 is delivered on the out-of-band channel 6 as [CCK_1]UEV, wherein UEV is the customer's User Encryption Variable, as discussed above. When decrypted in block 133, CCK_1 is obtained, which is fed to block 138, on line 135.

Block 138 uses the data on line 135 as the key to decrypt its input from the in-band channel 6. (In FIG. 14, that data represented CAK. Here, it is a CCK, thus explaining how the present CCK is used as a CAK.) Thus, block 138 uses CCK_1 as a key to decrypt [CCK_1]CCK_1, as indicated within the block, to produce CCK_1 on line 140, as in FIG. 14. The subsequent blocks 144, 152, and 159 proceed to decrypt PROGRAM_1 (labeled "CONTENT" in FIG. 26), in the same manner as FIG. 14.

This procedure provides several useful characteristics. One is that PROGRAM_1 is decrypted by the CCK_1 on line 140 in FIG. 26. CCK_1 is carried by line 140, and is effective for producing the CONTENT, on line 165, only so long as encryption process 200A in FIG. 25 uses that CCK as a key in line 240 or, equivalently, only so long as [CCK_1]CCK_1 is received by block 138 in FIG. 26 from the in-band channel 6.

That is, when CCK_1 changes, as indicated by a dot in FIGS. 16–23, the encryption processes 200 in FIG. 24 no longer use the CCK_1 produced on line 135 in FIG. 26. Even though the customer is in possession of that CCK_1 (on line 135), that CCK_1 has become obsolete, because of the change in CCK. Preferably, the interval between changes of CCK coincides with the duration of PROGRAM_1, which is preferably about two hours.

Using the key structure outlined above, a service provider has the option of offering customers the opportunity to purchase a long term entitlement to a program, say a movie channel for 30 days, or the option of purchasing a single program event, say a single movie. Customers who purchase the long term entitlement are provided with the program's CAK. This CAK allows the customer to obtain all the CCKs used by programs over the entire duration of the entitlement. Other customers may simply purchase a single movie and will be provided with a copy of the CCK used during the broadcast of the movie.

A second characteristic is that the customer obtains the actual CCK_1, encrypted by UEV, on the out-of-band channel 9, but cannot use it. That is, as explained above, the only external access to the equipment which implements the process shown in FIG. 26 is via the out-of-band channel 9 and, possibly, the user-controlled part 115 of the UEV register 112. All other busses (such as 135, 140, 148, and 155) are non-accessible, perhaps for the reason of existing within an integrated circuit, which is encased in silicon dioxide.

Thus, even if the customer can decrypt [CCK_1]UEV to obtain CCK_1, the customer cannot use the latter. The reason is that bus 135, which requires CCK_1, is physically non-accessible by the customer. As explained above, only keys that are themselves encrypted with the customer's unique UEV can be loaded into the customer's decryption hardware. Even if an attacker were to obtain a copy of the CCK being used by a program, it could not be effectively distributed to others. The reason is that, in order for this CCK to be loaded into their decryption hardware, they must first encrypt the CCK, using their own UEV as a key. But their own UEV's are unknown to them.

The requirement that only keys (such as CCK) which are encrypted by the appropriate UEV can be loaded into the decryption hardware prevents the unauthorized distribution of such keys throughout the provider's network. Since only the service provider's access control system knows a customer's UEV, only keys sent from the service provider can be downloaded into the customer's decryption hardware.

A third characteristic is that the customer, in effect, obtains access to a program (PROGRAM_1), which is contained within a package (such as PACKAGE A), but without obtaining access to PACKAGE_A generally. That is, CAK_A provides access to PACKAGE A generally, but the customer does not receive CAK_A. Instead, the customer receives a lesser-ranked key (CCK_1), but which is fed to the customer's hardware in place of CAK_A (to block 133, which ordinarily receives CAKs, as in FIG. 14).

Restated, the decryption hardware, which implements the processes shown in FIG. 14, requires a highest-ranked key, CAK, which is received from an out-of-band channel 9. This key grants access to all programs having a lower-ranked key which can be unlocked by the CAK, such as CCK_1 and CCK_3 for programs 1 and 3 in FIG. 27, which are unlocked by CAK_A.

However, the CAK can be replaced by CCK, as in FIG. 26. If this replacement is accompanied by encrypting, in the in-band channel, the lesser-ranked key (CCK) using itself as a key, then two results occur. One is that the lesser-ranked key on line 140 in FIG. 26 is still obtained, which allows attainment of the CONTENT.

The second result is that the lesser-ranked key on line 140 is attained without divulging the CAK, which normally produces the lesser-ranked key, to the customer. This result allows the service provider to sell two discrete types of programming material. One type is long-term entitlements to the programming material, by selling the CAK key, in the form of [CAK_A]UEV. The other type is short-term, on-demand entitlements to a single event which is contained within the long-term programming material, by selling the CCK needed for the particular event. In operation, the encryption hardware must send copies of [CCK]CCK and [CCK]CAK to customers via the in-band channel used to send the programming material.

4. The invention reduces the amount of memory required in the equipment, located at the customer's premises, which is required to implement the decryption processes shown in FIGS. 14 and 26. As an example, when CAK changes, such as at the end of the month, a new CAK must be delivered to each customer. But the new CAKs cannot be delivered to all customers instantaneously; a time period, or transition period, is required.

The encryption processes 200 in FIG. 24 cannot change the CAK used until all customers obtain possession of the new CAK. Otherwise, those customers lacking possession of the new CAK will be denied access to the programs encrypted using the new CAK.

Thus, during the transition period, at least some customers must store both the new CAK and the old CAK. They use the old CAK until the encryption processes 200 start using the new CAK, and then use the new CAK. This storage requires two memory locations for each CAK, or, for 100 CAKs, 200 memory locations.

Under the invention, this excess memory is eliminated. Consider a transition period at the end of June, which extends from June 27 to July 1. During this time, the invention transmits, preferably on the in-band channel, the CCK's (that is, the second-ranked keys) for all programs, but encrypted according to both the "old" CAK for June and the "new" CAK for July, as indicated by PACKAGE E in FIG. 27. These CCKs allow customers to obtain access to all lower-ranked keys, as indicated in FIG. 14.

Also during this time, the invention transmits the new CAKs to customers, via the out-of-band channel 9 in FIG. 26. When each customer receives a new CAK, the customer erases the old CAK, and replaces it with the new one. Thus, during the transition period, some customers will possess, and continue to use, the June CAK, and some will possess, and use, the July CAK.

Figure 27:
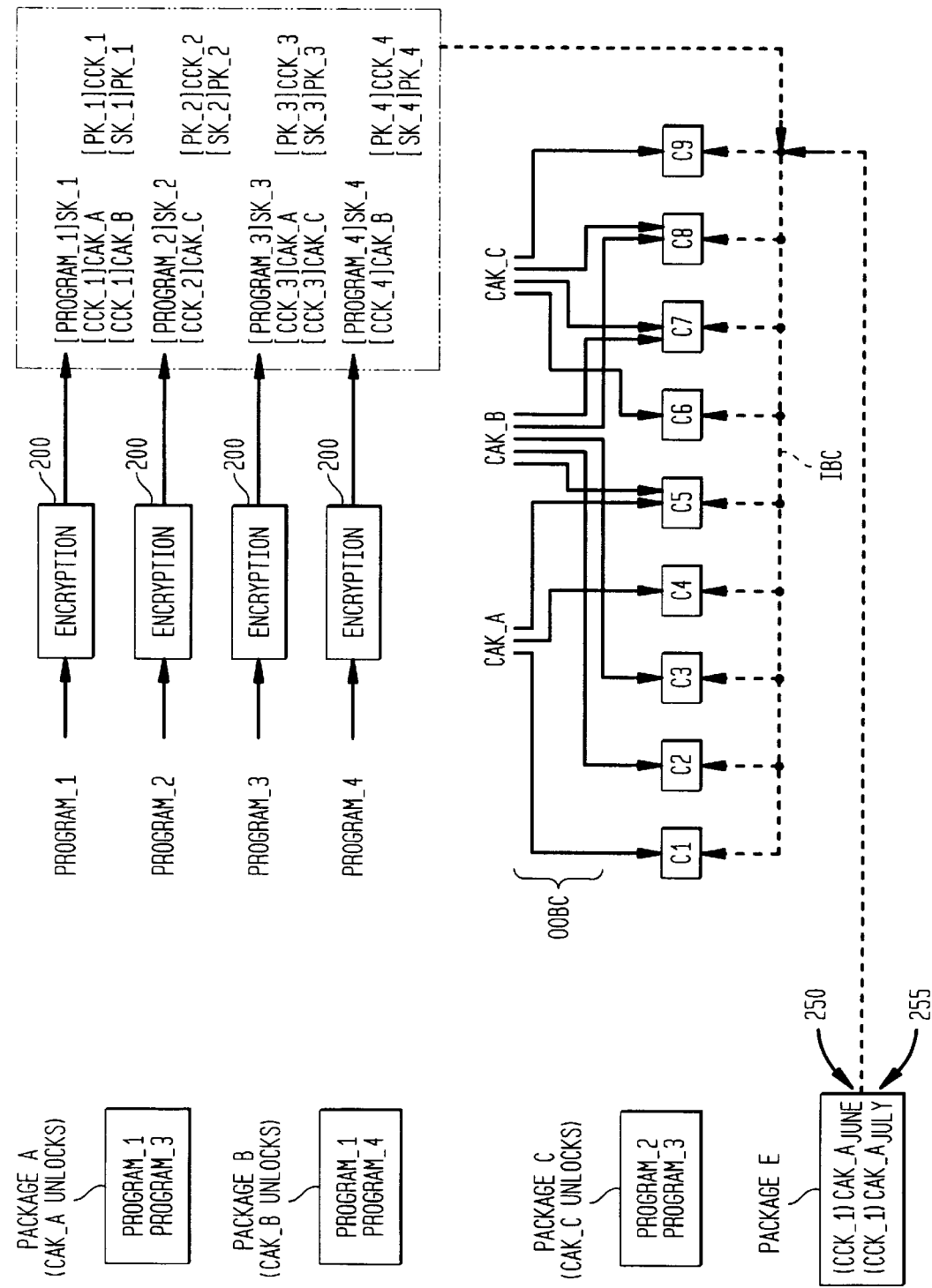
FIG. 27 illustrates a package carrying two keys, which are effective in two different months.
Figure 28:
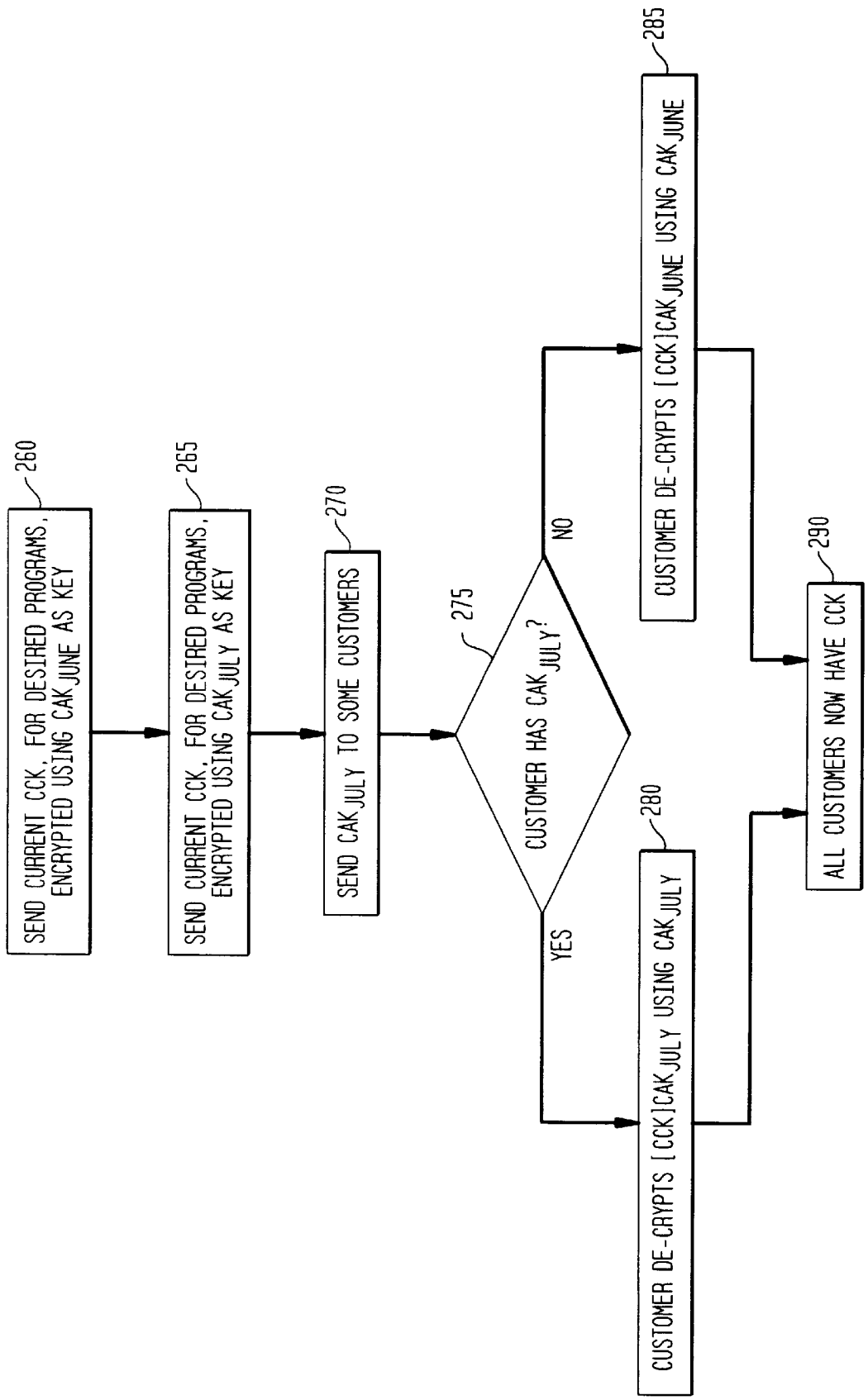
FIG. 28 illustrates distributing an old key and a new key in a single packet.

The customers' processing hardware simply chooses between data 250 or 255 in FIG. 27, to obtain the CCK, depending upon whether the customer possesses the June or July CAK. FIG. 28 illustrates the logic involved in the overall procedure.

Blocks 260 and 265 represent the transmission of data 250 and 255 in FIG. 27. Preferably, this transmission is done via the in-band channel 6, but can be accomplished through the out-of-band channel 9, or a combination of these channels. Block 270 represents the transmission of the new CAK, via the out-of-band channel 9, during the transition period. During this period, only some customers will be in possession of the new CAK, as block 270 indicates.

In block 275, the customer's hardware inquires whether the customer is in possession of the new CAK. If so, the logic reaches block 280, and decrypts data 255 in FIG. 27. If not, the logic reaches block 285 in FIG. 28, and decrypts data 250 in FIG. 27. In either case, the customer obtains possession of the proper CCK, as indicated in block 290 in FIG. 28. In effect, the customer resides at line 140 in FIG. 14, and can now obtain all lower-ranked keys, and, hence, access to the CONTENT.

The need for additional storage available in the customer's hardware has been eliminated by using a small amount of additional bandwidth in the in-band channel to send two copies of the program's CCK (that is, [CCK]new-CAK and [CCK]old-CAK). Once the transition period is over, and all customers are using the new CAK, the encryption hardware can discontinue inserting and sending [CCK]old-CAK to the customers.

5. Combining points 3 and 4, above, a ranking of keys is used, such as CAK then CCK then PK then SK in FIG. 14. A higher-ranked key allows attainment of all lower-ranked keys. Attainment of the lowest-ranked key (SK) allows decryption of the CONTENT.

In one form of the invention, the highest-ranked key (e.g., CAK) is given to some customers, who use it to obtain a middle-ranked key (CCK), and then the subsequent lower-ranked keys. But, to other customers, a middle-ranked key is given, who use it to obtain the lower-ranked keys.

In another form of the invention, hardware which decrypts the CONTENT, receives a hierarchy of ranked, encrypted keys. For example, in FIG. 14, block 133 receives the highest-ranked encrypted key ([CAK]UEV), block 130 receives the next-ranked encrypted key ([CCK]CAK), block 144 receives the next-ranked encrypted key ([PK]CCK), and block 152 receives the lowest-ranked encrypted key ([SK] PK).

Some customers' hardware receive the highest-ranked encrypted key ([CAK]UEV) on a given channel (preferably on the out-of-band channel), use it to obtain an intermediate key ([CCK]CAK being sent preferably on the in-band channel), and then reach the CONTENT. Other customers' hardware receive a different key (such as [CCK]UEV) on a given channel (preferably on the out-of-band channel), together with a lower-ranked encrypted key ([CCK]CCK) on another channel. These two keys allow attainment of the same intermediate key (CCK), to reach the CONTENT.

6. It was stated above, in Point number 3, that an individual program can be delivered to selected customers by encrypting CCK by itself, so that, for example, [CCK_1]CCK_1 acts as a CAK. However, use of this method requires that the encryption hardware, which is responsible for the generation of the CCK, must provide a copy of this key to the Access Control hardware. The Access Control hardware must have knowledge of the CCK in order to send, to customers wishing to purchase viewing rights to this event, a copy of the CCK encrypted with the customer's unique UEV (i.e., [CCK]UEV).

Another approach to delivering entitlements to selected programs, such as sports events, concerts, or single movies, is to treat each program as an individual package, with its own unique CAK, and containing a single program.

For example, in FIG. 25, Package D may contain such a single program. A unique CAK is assigned to the single program, and that CAK is delivered to all customers requesting the program. That CAK produces all the lower-ranked keys required to decrypt the program, in the manner described above. However, before and after the program is broadcast, that CAK is ineffective to decrypt anything else.

Pre-assigning a CAK for the event by the Access Control System allows the content provider to sell and transmit the viewing entitlements to the event well in advance of the event's actual broadcast. When the time arrives for broadcast of the event, the Access Control hardware down-loads to the encryption hardware a copy of the event's assigned CAK, such as CAK_se ("se": special event). The encryption hardware then starts sending copies of the current CCK encrypted with this additional CAK (i.e., [CCK] CAK_se) via the in-band channel carrying the event. At the end of the event, the encryption hardware stops using the event's CAK, and the customers can no longer obtain the value of CCK being used to encrypt the lower-ranked keys. Thus, continued viewing, by the "single-event customers," of other programs being sent via this channel is prevented.

Figure 29:
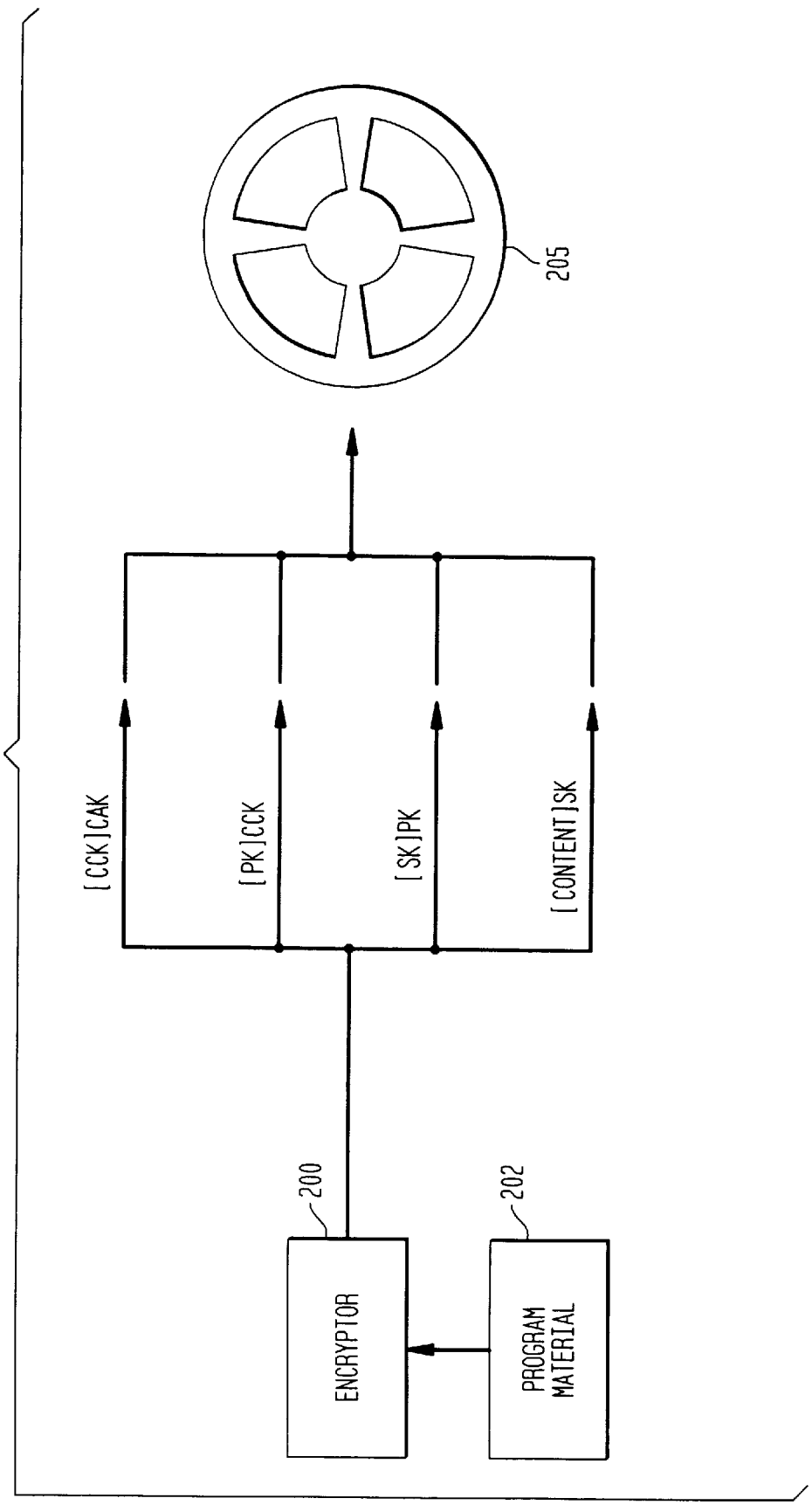
FIG. 29 illustrates how a single encryption algorithm can handle both previously encrypted material and material which is presently encrypted.

7. The invention allows a single system to handle both (a) previously encrypted material and (b) material which is encrypted in real time, just prior to distribution to customers. FIG. 29 provides an example of generating previously encrypted material. Program material 202, such as a movie, and which is not encrypted, is fed to an encryptor 200. The encryptor 200 performs encryption, such as that described in connection with FIG. 14, and produces encrypted content, [CONTENT]SK, together with the keys [SK]PK, [PK]CCK, and[CCK]CAK, as indicated in FIG. 29. (The keys can be changed periodically, as described above. The value of CAK is not changed during the duration of the event.)

It is significant that, in addition to generating all the required lower-ranked encryption keys (SK, PK, CCK), the encryption hardware also generates the highest-ranked key (CAK). (In previous discussions, the CAK key was generated and down-loaded to the encryption hardware from the content provider's Access Control system.) This encrypted material is stored on a storage medium, such as a reel of video tape 205.

During encryption, the same encryption process occurs as described above in connection with FIG. 14. The encrypted program, namely, [CONTENT]SK, together and periodic data packets containing decryption keys, namely, [SK]PK+ [PK]CCK+[CCK]CAK, are delivered to, and recorded onto, the tape 205 in FIG. 29, instead of being delivered directly to customers.

In one embodiment of the invention, the CAK used for the encryption is itself encrypted using a "transportation key." The encrypted CAK accompanies the tape 205, in some conveniently accessible place, such as in a header of the tape, or on a label fastened to the tape 205. The transportation key, which will be used to decrypt the encrypted CAK which accompanies the tape, is sent by a separate transmission medium to the intended recipient of the tape.

One reason for this procedure is to assure that only the intended recipient obtains access to the CAK, and that no other parties do so. That is, only the intended recipient of the tape will possess the encrypted CAK, together with the transportation key needed to decrypt the encrypted CAK. If this procedure were not undertaken, then mere possession of the tape itself would confer possession of the CAK.

The agent wishing to distribute the pre-encrypted program material, such as a cable television operator, reads the CAK, and delivers the CAK to customers wishing to purchase the material. Delivery methods were described above.

Figure 30:
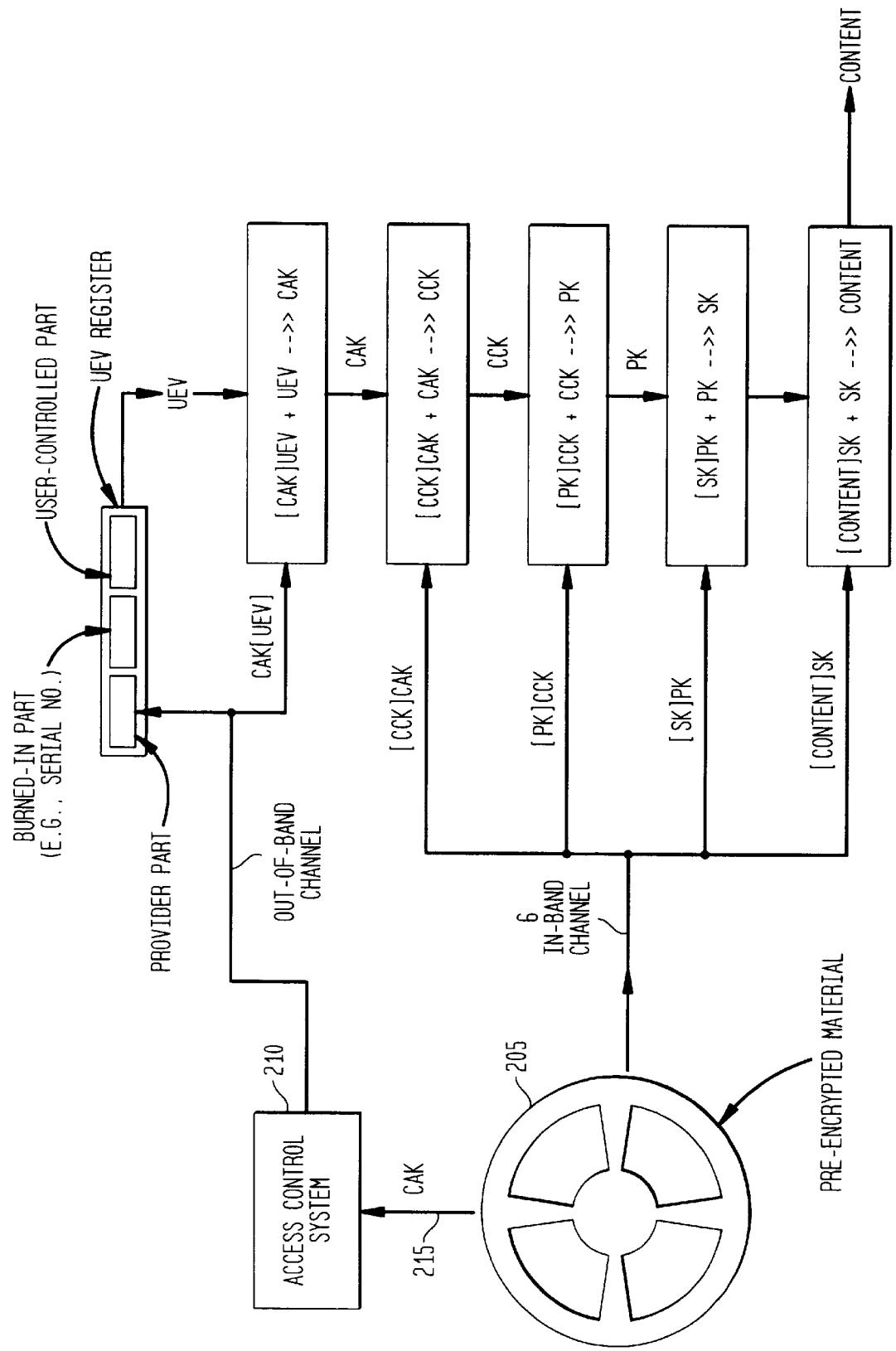
FIG. 30 illustrates distribution of previously encrypted material.

Then, when the program material is to be distributed (that is, the program is to be "shown"), the content of the tape 205 is broadcast directly to the in-band channel 6, as indicated in FIG. 30, without further encryption. Those customers in possession of the CAK can decrypt the program material.

Therefore, for pre-encrypted material, FIG. 30 illustrates two significant events. One is that the CAK needed to decrypt the material contained on the tape 205 is generated by the encryption hardware and then obtained by an Access Control System 210, as indicated by arrow 215, and distributed to customers who wish to obtain the program material. This distribution will generally occur prior to broadcast of the program material.

The second event is the broadcast of the encrypted program material, together with the embedded data packets containing the hierarchy of keys, [CCK]CAK, [PK]CCK, and [SK]PK. This broadcast is accomplished by playing the tape 205 directly to the in-band channel 6.

A slightly different approach is taken for "real-time" encryption of material. The phrase "real-time" refers to the time of encryption, rather than to whether the material encrypted represents a real-time event. For example, a "live" college football game can be encrypted as it is played. This is a real-time event which is encrypted in real-time. In contrast, a pre-recorded movie (which is not "live") can be encrypted, in real time, at the time it is distributed to customers, through the in-band channel 6 in FIG. 31. This latter case represents pre-recorded material that is encrypted in real-time.

Figure 31:
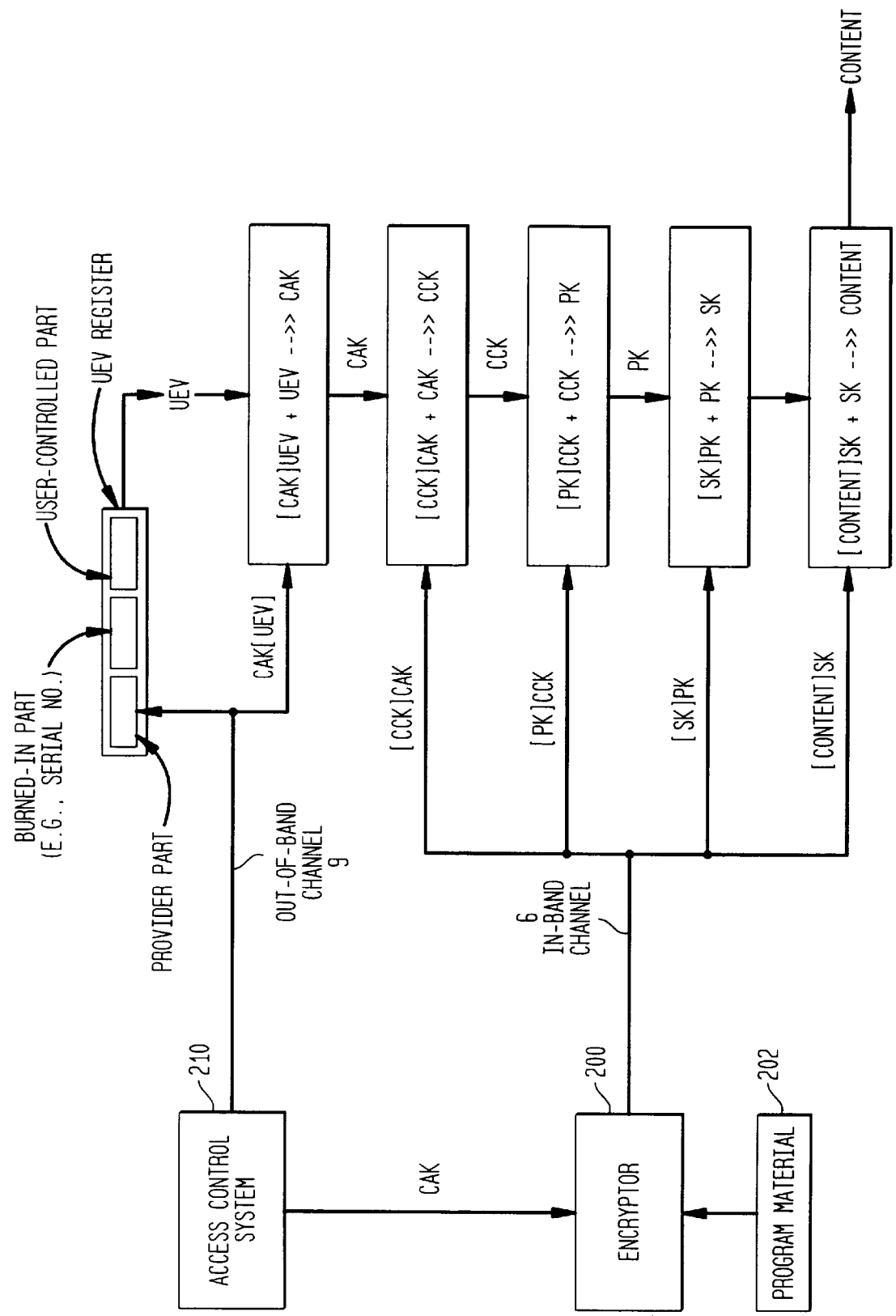
FIG. 31 illustrates an ACCESS CONTROL SYSTEM 210 dictating the choice of CAK to an ENCRYPTOR 200.

In both real-time cases, the CAK used is dictated by an access control system 210 in FIG. 31. That is, in practice, the access control system 210 will generate and distribute the CAK, in advance, to customers wishing to receive the "real-time" program material. Then, at the time of broadcast, the program material 202 is encrypted. The access control system 210 tells the encryptor 200 what CAK, or combination of CAKs, to use. The encryptor 200 encrypts the program material, generates the appropriate lower-ranked keys, and delivers these to the in-band channel 6, as indicated in FIG. 31.

As explained in earlier discussions, if the program material is offered in several different packages, then the Access Control System will provide the encryption hardware with the CAKs for each package including this programming material. For example, if the programming material is being sold as part of Package A, Package C, and Package D, than the Access Control System would provide the encryption hardware with three CAKs (i.e., CAK_A, CAK_C, and CAK_D). During the encryption process, the encryption hardware would encrypt the CCK key using each of these CAKs. The decryption data packets sent to the customers via the in-band channel would thus contain the following data: [CCK]CAK_A, [CCK]CAK_C, [CCK]CAK_D, [PK]CCK, and [SK]PK.

One important feature of the system just described is that, during "real-time" encryption, the encryptor 200 may fail. A replacement encryptor (not shown) can be immediately substituted, and given the proper CAK by the access control system 210. The replacement encryptor's algorithms are designed to automatically generate its own unique lower-ranked keys. However, these keys still allow access to the program material, using the existing CAK which is resident in the customers' set-top boxes. No significant interruption in service to customers occurs.

One important benefit of this arrangement can be seen by contrasting it with another approach. Assume that the encryptor 200 generates its own CAK, and informs the access control system 210 of the CAK, rather than the access control system 210 generating the CAK. If this encryptor should fail, then its replacement will generate its own CAK. That CAK will, in general, be different from the failed encryptor's CAK.

Consequently, upon failure, a new CAK must be delivered to the customers, who can number in the hundreds of thousands. The Access Control System must generate a unique message for each customer, containing the new CAK encrypted by each customer's unique UEV (i.e., [CAK] UEV). This CAK-delivery can consume significant time, thus causing the failure of the encryptor to interrupt delivery of the program to the customers while the customers are given the new CAK. The invention avoids this delay.

A second feature is that in "real-time" encryption, the access control system 210 chooses the CAK, as indicated in FIG. 31, contrary to the pre-encrypted case of FIG. 29, wherein the encryptor 200 chooses the CAK. By allowing the access control system 210 to choose the CAK, the choice of CAK can be made in advance, so that the CAK can be delivered to customers, prior to broadcast of the program which the CAK unlocks. In contrast, if the encryptor 200 were to choose the CAK, then, for practical reasons, it is almost required that the choice be made at the time of broadcast, thereby precluding advance distribution of the CAK.

A third feature made possible by having the Access Control System generate and provide the CAK is the allowance of multiple programming packages to use the encrypted output of a single encryption device. While the programming content is only encrypted once, using unique keys known only to the encryption process (i.e., SK, PK, and CCK), the encrypted material can be sold and distributed as part of any number of individual programming packages. To add the output of the encryptor to a package only requires that the Access Control System provide to the encryption hardware the CAK associated with that package. For every package to which the programming material is a member, the encryption hardware simply inserts into the decryption data packet a copy of the CCK encrypted by that package's CAK (i.e., [CCK]CAK_A, [CCK]CAK_C, etc).

8. The discussion above was framed in terms of a cable television system, for illustration purposes. However, the invention is applicable to other video distribution systems, such as satellite systems, and also restricted-access television systems generally. In addition, the invention is applicable to other information distribution systems, such as computer networks.

9. In one embodiment, some keys may stronger, and other keys may be weaker. For example, key PK or CCK, or both, in FIG. 14 may be strong keys. For example, they may be of sufficient length to make a "brute force" attack impractical. They may unlock cipher text which is encrypted using a relatively strong algorithm, such as triple-DES. In contrast, key SK may be a relatively weak key, and may allow a "brute force" attack. It unlocks cipher text which is encrypted using a relatively weak algorithm, such as single-DES.

The term "DES" is an acronym for the phrase "Data Encryption Standard," and is known in the art. The terms "strong" and "weak" have definitions known in the art. One definition relies on a comparison of the difficulty of cracking or obtaining the key using various attacks and methods. A "stronger" key requires more time, or greater resources, or both, to crack, if cracking is successful at all, than a weaker key.

In addition, as a general principle, a longer key (e.g., 30 bits is longer than 10 bits) tends to be stronger than a shorter key. Thus, consistent with statements immediately above, the key SK may be short, compared with key PK.

10. As noted above, in order to reduce the cost of the decryption hardware, a very simple encryption algorithm and weak key was required. Thus, single-DES encryption of the programming data was performed using a short key (56-bits). Use of a more complex encryption algorithm (i.e., triple-DES encryption) at the high data rates required by a complex digital television system would require a much more expensive decryption circuit.

However, the invention allows for the triple-DES encryption of the SK, PK, and CCK keys. Since encryption of these keys only occurs when the value of the key is changed, there is sufficient time for even the low-cost encryption/decryption devices to perform a triple-DES encryption operation on these keys. For example, the encryption of the SK key using the PK key, into [SK]PK, is only performed when the value of the SK key changes. Since this may occur once every 5 minutes, the decryption hardware has sufficient time to decrypt this key prior to its use.

Therefore, while the length of the SK key is kept short to keep the cost of the decryption hardware low, the PK, CCK, and CAK keys can be very long keys. In one embodiment of the invention, triple-DES encryption is used to encrypt the SK, PK, and CCK keys. Thus, PK, CCK, and CAK are 112-bit keys. However, nothing in the invention would prevent using even longer keys to encrypt the SK, PK, and CCK keys. The only requirement being that the key change rate be low enough to allow completion of the key decryption operation before the key is actually used.

11. The term "set-top box" was used above. That term is commonly used in analog cable television systems. Another term for the analogous apparatus in digital systems is coming into common use, namely, "digital home video terminal", or DHVT. Both perform the function of decoding, or decrypting, program material.

Numerous substitutions and modifications can be undertaken without departing from the true spirit and scope of the invention as defined in the following claims. What is desired to be secured by Letters Patent is the invention as defined in the following claims.

What is claimed is:

1. In a restricted-access television system, the improvement comprising the following steps:
   a) transmitting a first key which decrypts first program material; and
   b) transmitting a second key which
      i) produces the first key from cipher text; and
      ii) decrypts second program material.

2. In a restricted-access television system, the improvement comprising:
   a) means for transmitting a first key which decrypts first program material; and
   b) means for transmitting a second key which
      i) produces the first key from cipher text; and
      ii) decrypts second program material.

* * * * *